(12) United States Patent
Li et al.

(10) Patent No.: US 11,324,026 B2
(45) Date of Patent: May 3, 2022

(54) CONTROL INFORMATION TRANSMISSION METHOD, TRANSMIT END, AND RECEIVE END

(71) Applicant: HUAWEI TECHNOLOGIES CO., LTD., Guangdong (CN)

(72) Inventors: Chao Li, Beijing (CN); Xingwei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/923,453

(22) Filed: Mar. 16, 2018

(65) Prior Publication Data

US 2018/0206264 A1    Jul. 19, 2018

Related U.S. Application Data

(63) Continuation of application No. PCT/CN2015/089992, filed on Sep. 18, 2015.

(51) Int. Cl.
*H04W 72/12* (2009.01)
*H04W 72/14* (2009.01)

(52) U.S. Cl.
CPC ... *H04W 72/1278* (2013.01); *H04W 72/1242* (2013.01); *H04W 72/14* (2013.01)

(58) Field of Classification Search
CPC . H04W 72/1278; H04W 72/12; H04W 72/00; H04W 72/1242; H04W 72/1205; H04W 72/14

(Continued)

(56) References Cited

U.S. PATENT DOCUMENTS 9,769,699 B2 *   9/2017   Tseng ............... H04W 28/0278
10,568,114 B2 *  2/2020   Tseng ............... H04W 72/0493
(Continued)

FOREIGN PATENT DOCUMENTS

CN    102422584 A    4/2012
CN    102612090 A    7/2012
(Continued)

OTHER PUBLICATIONS

Notice of Reasons for Rejection, dated Nov. 26, 2018, in Japanese Application No. 2018511719 (15 pp.).

(Continued)

*Primary Examiner* — Jeffrey M Rutkowski
*Assistant Examiner* — Luna Weissberger
(74) *Attorney, Agent, or Firm* — Stein IP, LLC

(57) ABSTRACT

Embodiments of the present invention provide a control information transmission method, a transmit end, and a receive end. The method includes: determining, by the transmit end, a first time domain resource used for sending scheduled data and a second time domain resource used for sending control information of the scheduled data in a transmission period, where the second time domain resource is a subset of the first time domain resource; and sending, by the transmit end, the control information on the second time domain resource, where the control information includes a parameter used to instruct the receive end to receive the scheduled data. Using the present invention can improve a success rate of data detection, shorten a transmission delay, and further improve reliability of a communications system.

24 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2012/0273077 A1* | 11/2012 | Lang | ................... F16K 99/0001 138/40 |
| 2015/0092710 A1 | 4/2015 | Novlan et al. | |
| 2015/0201406 A1 | 7/2015 | Zhang | |
| 2015/0245334 A1 | 8/2015 | Chang | |
| 2015/0312933 A1* | 10/2015 | Eriksson | ............ H04W 72/1263 370/329 |
| 2016/0183276 A1* | 6/2016 | Marinier | ................ H04W 72/12 370/329 |
| 2016/0323870 A1 | 11/2016 | Wei et al. | |
| 2016/0338016 A1 | 11/2016 | Matsumoto et al. | |
| 2016/0353410 A1 | 12/2016 | Wang et al. | |
| 2017/0027014 A1 | 1/2017 | Chae et al. | |
| 2017/0105230 A1* | 4/2017 | Matsumoto | ............ H04L 5/0094 |
| 2017/0273077 A1* | 9/2017 | Kim | ................... H04W 72/0446 |
| 2018/0338319 A1* | 11/2018 | Kim | .................... H04L 27/2678 |

FOREIGN PATENT DOCUMENTS

| | | |
|---|---|---|
| CN | 103139764 A | 6/2013 |
| CN | 104185281 A | 12/2014 |
| CN | 104202740 A | 12/2014 |
| CN | 104349479 A | 2/2015 |
| CN | 104469961 A | 3/2015 |
| CN | 104754763 A | 7/2015 |
| CN | 104811909 A | 7/2015 |
| CN | 104883743 A | 9/2015 |
| CN | 105453672 A | 3/2016 |
| EP | 3 148 097 A1 | 3/2017 |
| JP | 2013505656 A | 2/2013 |
| WO | WO 2015/021185 A1 | 2/2015 |
| WO | WO 2015/065015 A1 | 5/2015 |
| WO | 2015115508 A1 | 8/2015 |
| WO | 2015116865 A1 | 8/2015 |
| WO | 2015137781 A1 | 9/2015 |
| WO | WO-2018059589 A1 * | 4/2018 ........ H04W 72/0446 |

OTHER PUBLICATIONS

Catt, "On D2D resource collision," 3GPP Draft; R1-144613, 3rd Generation Partnership Project (3GPP), RAN WG1, Meeting #79, San Francisco, California, USA; Nov. 17-21, 2014, XP050875700, 4 pgs.

Huawei, Hisilicon, "Open issues for aperiodic and periodic CSI reporting," 3GPP Draft; R1-110021, 3rd Generation Partnership Project (3GPP), RAN WG1, Meeting #63bis, Dublin, Ireland; Jan. 17-21, 2011, XP050490004, 4 pgs.

Ericsson, "Synchronization Signals and Channel Design for D2D Discovery and Communication," 3GPP Draft R1-135903, RAN WG1, Meeting #75, San Francisco, California, USA; Nov. 11-15, 2013, XP050751320, 10 pgs.

Extended European Search Report dated Jun. 29, 2018 in corresponding European Patent Application No. 15903891.8, 12 pgs.

LG Electronics, "Multiple scheduling assignment transmission within a SC period", 3GPP TSG RAN WG1 Meeting #82 Beijing, China, Aug. 24-28, 2015, R1-154256, Aug. 28, 2015, 5 pages.

Ericsson, "D2D Scheduling Procedure", 3GPP TSG-RAN WG2 #84 San Francisco, USA, Nov. 11-15, 2013, Tdoc R2-134238, Nov. 15, 2013, 7 pages.

International Search Report dated Jun. 12, 2016 in International Patent Application No. PCT/CN2015/089992.

Chinese Office Action dated May 17, 2019 in related Chinese Patent Application No. 201580030203.8 (22 pages).

Ericsson:"On Timing and D2D Signals Multiplexing", 3GPP TSG-RAN WG1 Meeting #78, R1-143365, Dresden, Germany, Aug. 18-22, 2014, total 5 pages.

Yong Liu et al. Resource allocation for device-to-device broadcast communication in cellular networks, 2015 IEEE 26th Annual International Symposium on Personal, pp. 1178-1183.

Zhou Xin et al. Research on Resources Allocation of Device-to-device Communications, Beijing Jiaotong University, Jun. 2014. total 64 pages. With English abstract.

* cited by examiner

CONTROL INFORMATION TRANSMISSION METHOD, TRANSMIT END, AND RECEIVE END

CROSS-REFERENCE TO RELATED APPLICATIONS

This application is a continuation of International Application No. PCT/CN2015/089992, filed on Sep. 18, 2015, which is hereby incorporated by reference in their entireties.

TECHNICAL FIELD

The present disclosure relates to the field of communications technologies, and in particular, to a control information transmission method, a transmit end, and a receive end.

BACKGROUND

Recently, intelligent transportation and a self-driving technology attract wide attention. To implement vehicle control in the self-driving and the intelligent traffic, a higher requirement is raised for a communications technology with a high capacity and high reliability. Particularly, detection of a data packet used for communication between vehicles requires accuracy of more than 95%. A current Internet of Vehicles related research initiated by the 3GPP is mainly for enhancement based on device to device (D2D).

In D2D communication, a diagram of a relationship between control information and scheduled data of the control information in device-to-device communication is shown in FIG. 1, in which the control information (that is, SA in FIG. 1) and the scheduled data (that is, DATA in FIG. 1) separately occupy different time domain resources by means of time division. A time domain resource of the control information precedes a time domain resource of the scheduled data, and is used to schedule transmission of one or more subsequent data packets.

In the existing D2D technology, user equipment (UE) works in a half-duplex manner, that is, the UE cannot send data while receiving data, and on the contrary, the UE cannot receive data while sending data. It is assumed that both a probability of successfully detecting the control information and a probability of successfully detecting the scheduled data are 90%. Because the control information and the scheduled data use different resource pools, a probability of successfully detecting both the control information and the scheduled data by the UE is 0.9×0.9=0.81. Design in the prior art causes a relatively low reliability of a communications system.

SUMMARY

Embodiments of the present invention provide a control information transmission method, a transmit end, and a receive end, so as to improve reliability of a communications system.

A first aspect of the present invention provides a control information transmission method, including:

determining, by a transmit end, a first time domain resource used for sending scheduled data and a second time domain resource used for sending control information of the scheduled data in a transmission period, where the second time domain resource is a subset of the first time domain resource; and sending, by the transmit end, the control information on the second time domain resource, where the control information includes a parameter used to instruct a receive end to receive the scheduled data.

In a first possible implementation of the first aspect, a subframe that is of the second time domain resource and that is occupied by the control information in the transmission period is completely the same as, partially the same as, or totally different from a subframe that is of the first time domain resource and that is occupied by the scheduled data.

With reference to the first aspect or the first possible implementation of the first aspect, in a second possible implementation, the second time domain resource includes M child time domain resources, and each child time domain resource includes K subframes used for sending the control information, where M and K are signaling configured or predefined, and M and K are positive integers not less than 1.

With reference to the first aspect or the first possible implementation of the first aspect, in a third possible implementation, the second time domain resource includes N subframes used for sending the control information, where N is signaling configured or predefined, and N is a positive integer not less than 1.

With reference to any one of the first aspect or the first to the third possible implementations of the first aspect, in a fourth possible implementation, the sending, by the transmit end, the control information on the second time domain resource includes:

determining, by the transmit end, a time domain location of the control information from the second time domain resource in a predefined time domain location determining manner, and determining a frequency domain location of the control information from a frequency domain resource set of the second time domain resource in a predefined frequency domain location determining manner; and sending, by the transmit end, the control information by using the determined time domain location and the determined frequency domain location.

With reference to the fourth possible implementation of the first aspect, in a fifth possible implementation, the frequency domain resource set of the second time domain resource is determined in at least one of the following manners:

determined by an indication identifier in the control information;

determined by a subframe number of a subframe in which the control information is located;

determined by a radio frame number of a subframe in which the control information is located;

determined by a carrier identifier of a carrier in which the control information is located; or determined in a preset manner in which the control information is mapped to a physical resource block.

With reference to any one of the first aspect or the first to the fifth possible implementations of the first aspect, in a sixth possible implementation, a start subframe of the second time domain resource is determined after a start subframe of the first time domain resource is offset by using a preset offset value.

With reference to the sixth possible implementation of the first aspect, in a seventh possible implementation, the preset offset value includes Q candidate values, where Q is signaling configured or predefined, and Q is a positive integer not less than 1.

With reference to any one of the first aspect or the first to the seventh possible implementations of the first aspect, in an eighth possible implementation, the transmit end determines, in a bit mapping manner, the first time domain resource from a time domain resource provided by a system, and the transmit end determines, in the bit mapping manner, the second time domain resource from a resource provided in the second time domain resource.

With reference to any one of the first aspect or the first to the eighth possible implementations of the first aspect, in a ninth possible implementation, the transmit end includes an in-vehicle device or a roadside unit.

Correspondingly, a second aspect of the present invention provides a transmit end, including:

a processing module, configured to determine a first time domain resource used for sending scheduled data and a second time domain resource used for sending control information of the scheduled data in a transmission period, where the second time domain resource is a subset of the first time domain resource; and a sending module, configured to send the control information on the second time domain resource, where the control information includes a parameter used to instruct a receive end to receive the scheduled data.

In a first possible implementation of the second aspect, a subframe that is of the second time domain resource and that is occupied by the control information in the transmission period is completely the same as, partially the same as, or totally different from a subframe that is of the first time domain resource and that is occupied by the scheduled data.

With reference to the second aspect or the first possible implementation of the second aspect, in a second possible implementation, the second time domain resource includes M child time domain resources, and each child time domain resource includes K subframes used for sending the control information, where M and K are signaling configured or predefined, and M and K are positive integers not less than 1.

With reference to the second aspect or the first possible implementation of the second aspect, in a third possible implementation, the second time domain resource includes N subframes used for sending the control information, where N is signaling configured or predefined, and N is a positive integer not less than 1.

With reference to any one of the second aspect or the first to the third possible implementations of the second aspect, in a fourth possible implementation, the sending module is specifically configured to:

determine a time domain location of the control information from the second time domain resource in a predefined time domain location determining manner, and determine a frequency domain location of the control information from a frequency domain resource set of the second time domain resource in a predefined frequency domain location determining manner; and send the control information by using the determined time domain location and the determined frequency domain location.

With reference to the fourth possible implementation of the second aspect, in a fifth possible implementation, the frequency domain resource set of the second time domain resource is determined in at least one of the following manners:

determined by an indication identifier in the control information;

determined by a subframe number of a subframe in which the control information is located;

determined by a radio frame number of a subframe in which the control information is located;

determined by a carrier identifier of a carrier in which the control information is located; or determined in a preset manner in which the control information is mapped to a physical resource block.

With reference to any one of the second aspect or the first to the fifth possible implementations of the second aspect, in a sixth possible implementation, a start subframe of the second time domain resource is determined after a start subframe of the first time domain resource is offset by using a preset offset value.

With reference to the sixth possible implementation of the second aspect, in a seventh possible implementation, the preset offset value includes Q candidate values, where Q is signaling configured or predefined, and Q is a positive integer not less than 1.

With reference to any one of the second aspect or the first to the seventh possible implementations of the second aspect, in an eighth possible implementation, the transmit end determines, in a bit mapping manner, the first time domain resource from a time domain resource provided by a system, and the transmit end determines, in the bit mapping manner, the second time domain resource from a resource provided in the second time domain resource.

With reference to any one of the second aspect or the first to the eighth possible implementations of the second aspect, in a ninth possible implementation, the transmit end includes an in-vehicle device or a roadside unit.

Correspondingly, a third aspect of the present invention further provides a transmit end, where the transmit end includes a processor, a memory, and a network interface, the memory stores a set of programs, and the processor is configured to invoke the program stored in the memory, so that the transmit end performs some or all steps of the first aspect.

Correspondingly, a fourth aspect of the present invention further provides a computer storage medium, where the computer storage medium stores a program, and when executed, the program includes some or all steps of the first aspect.

A fifth aspect of the present invention provides a control information transmission method, including:

determining, by a receive end, a second time domain resource used for sending control information of scheduled data in a transmission period, where the second time domain resource is a subset of a first time domain resource, and the first time domain resource is a time domain resource of the scheduled data in the transmission period; and receiving, by the receive end, the control information on the second time domain resource, where the control information includes a parameter used to instruct the receive end to receive the scheduled data.

In a first possible implementation of the fifth aspect, the second time domain resource includes M child time domain resources, and each child time domain resource includes K subframes used for sending the control information, where M and K are signaling configured or predefined, and M and K are positive integers not less than 1.

In a second possible implementation of the fifth aspect, the second time domain resource includes N subframes used for sending the control information, where N is signaling configured or predefined, and N is a positive integer not less than 1.

With reference to any one of the fifth aspect or the first and the second possible implementations of the fifth aspect, in a third possible implementation, the receiving, by the receive end, the control information on the second time domain resource includes: determining, by the receive end, a time domain location of the control information in the second time domain resource in a predefined time domain location determining manner, and detecting and receiving the control information at the determined time domain location according to a frequency domain resource set.

With reference to the third possible implementation of the fifth aspect, in a fourth possible implementation, the detecting and receiving, by the receive end, the control information at the determined time domain location according to a frequency domain resource set includes: successively detecting, by the receive end, the control information at the determined time domain location according to the frequency domain resource set, and if the control information is not detected at a current time domain location, detecting the control information at a next time domain location.

With reference to the third or the fourth possible implementation of the fifth aspect, in a fifth possible implementation, the frequency domain resource set of the second time domain resource is determined in at least one of the following manners:

determined by an indication identifier in the control information;

determined by a subframe number of a subframe in which the control information is located;

determined by a radio frame number of a subframe in which the control information is located;

determined by a carrier identifier of a carrier in which the control information is located; or determined in a preset manner in which the control information is mapped to a physical resource block.

With reference to any one of the fifth aspect or the first to the fifth possible implementations of the fifth aspect, in a sixth possible implementation, a start subframe of the second time domain resource is determined after a start subframe of the first time domain resource is offset by using a preset offset value.

With reference to the sixth possible implementation of the fifth aspect, in a seventh possible implementation, the preset offset value includes Q candidate values, where Q is signaling configured or predefined, and Q is a positive integer not less than 1.

With reference to any one of the fifth aspect or the first to the seventh possible implementations of the fifth aspect, in an eighth possible implementation, the receive end includes an in-vehicle device or a roadside unit.

Correspondingly, a sixth aspect of the present invention provides a receive end, including:

a processing module, configured to determine a second time domain resource used for sending control information of scheduled data in a transmission period, where the second time domain resource is a subset of a first time domain resource, and the first time domain resource is a time domain resource of the scheduled data in the transmission period; and a receiving module, configured to receive the control information on the second time domain resource, where the control information includes a parameter used to instruct the receive end to receive the scheduled data.

In a first possible implementation of the sixth aspect, the second time domain resource includes M child time domain resources, and each child time domain resource includes K subframes used for sending the control information, where M and K are signaling configured or predefined, and M and K are positive integers not less than 1.

In a second possible implementation of the sixth aspect, the second time domain resource includes N subframes used for sending the control information, where N is signaling configured or predefined, and N is a positive integer not less than 1.

With reference to any one of the sixth aspect or the first and the second possible implementations of the sixth aspect, in a third possible implementation, the receiving module is specifically configured to: determine a time domain location of the control information in the second time domain resource in a predefined time domain location determining manner, and detect and receive the control information at the determined time domain location according to a frequency domain resource set.

With reference to the third possible implementation of the sixth aspect, in a fourth possible implementation, the receiving module is specifically configured to: successively detect the control information at the determined time domain location according to the frequency domain resource set, and if the control information is not detected at a current time domain location, detect the control information at a next time domain location.

With reference to the third or the fourth possible implementation of the sixth aspect, in a fifth possible implementation, the frequency domain resource set of the second time domain resource is determined in at least one of the following manners:

determined by an indication identifier in the control information;

determined by a subframe number of a subframe in which the control information is located;

determined by a radio frame number of a subframe in which the control information is located;

determined by a carrier identifier of a carrier in which the control information is located; or determined in a preset manner in which the control information is mapped to a physical resource block.

With reference to any one of the sixth aspect or the first to the fifth possible implementations of the sixth aspect, in a sixth possible implementation, a start subframe of the second time domain resource is determined after a start subframe of the first time domain resource is offset by using a preset offset value.

With reference to the sixth possible implementation of the sixth aspect, in a seventh possible implementation, the preset offset value includes Q candidate values, where Q is signaling configured or predefined, and Q is a positive integer not less than 1.

With reference to any one of the sixth aspect or the first to the seventh possible implementations of the sixth aspect, in an eighth possible implementation, the receive end includes an in-vehicle device or a roadside unit.

Correspondingly, a seventh aspect of the present invention further provides a receive end, where the receive end includes a processor, a memory, and a network interface, the memory stores a set of programs, and the processor is configured to invoke the program stored in the memory, so that the receive end performs some or all steps of the fifth aspect.

Correspondingly, an eighth aspect of the present invention further provides a computer storage medium, where the computer storage medium stores a program, and when executed, the program includes some or all steps of the eighth aspect.

A ninth aspect of the present invention further provides a control information transmission method, including:

determining, by a transmit end, a first time domain resource of first-type control information and scheduled data of the first-type control information;

determining, by the transmit end, a second time domain resource of second-type control information and scheduled data of the second-type control information; and determining, by the transmit end, whether the second-type control information or the scheduled data of the second-type control information meets a preset condition; and if the second-type control information or the scheduled data of the second-type control information meets the preset condition, sending, by the transmit end, the second-type control information and the scheduled data of the second-type control information in the first time domain resource.

In a first possible implementation of the ninth aspect, the preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

In a second possible implementation of the ninth aspect, the second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

With reference to the ninth aspect or the first or the second possible implementation of the ninth aspect, in a third possible implementation, the sending, by the transmit end, the second-type control information and the scheduled data of the second-type control information in the first time domain resource includes:

sending, by the transmit end, the second-type control information and the scheduled data of the second-type control information after a current transmission period of the first time domain resource ends; or sending, by the transmit end, the second-type control information and the scheduled data of the second-type control information in a current transmission period of the first time domain resource.

With reference to any one of the ninth aspect or the first to the third possible implementations of the ninth aspect, in a fourth possible implementation, after the transmit end completely sends the second-type control information and the scheduled data of the second-type control information, the method further includes:

continuing, by the transmit end, to send the first-type control information and/or the scheduled data of the first-type control information in the first time domain resource; or resending, by the transmit end, the first-type control information and/or the scheduled data of the first-type control information in the first time domain resource.

With reference to any one of the ninth aspect or the first to the fourth possible implementations of the ninth aspect, in a fifth possible implementation, the first time domain resource includes J child time domain resource groups, and each child time domain resource group includes at least one child time domain resource, where J is a positive integer not less than 1.

With reference to the fifth possible implementation of the ninth aspect, in a sixth possible implementation, the sending, by the transmit end, the second-type control information and the scheduled data of the second-type control information in the first time domain resource includes:

sending, by the transmit end, the second-type control information and the scheduled data of the second-type control information in at least two child time domain resource groups.

With reference to any one of the ninth aspect or the first to the sixth possible implementations of the ninth aspect, in a seventh possible implementation, the transmit end includes an in-vehicle device or a roadside unit.

Correspondingly, a tenth aspect of the present invention further provides a transmit end, including:

a processing module, configured to determine a first time domain resource of first-type control information and scheduled data of the first-type control information, where the processing module is further configured to determine a second time domain resource of second-type control information and scheduled data of the second-type control information;

a determining module, configured to determine whether the second-type control information or the scheduled data of the second-type control information meets a preset condition; and a sending module, configured to: if the second-type control information or the scheduled data of the second-type control information meets the preset condition, send the second-type control information and the scheduled data of the second-type control information in the first time domain resource.

In a first possible implementation of the tenth aspect, the preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

In a second possible implementation of the tenth aspect, the second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

With reference to the tenth aspect or the first or the second possible implementation of the tenth aspect, in a third possible implementation, the sending module is specifically configured to:

send the second-type control information and the scheduled data of the second-type control information after a current transmission period of the first time domain resource ends; or send the second-type control information and the scheduled data of the second-type control information in a current transmission period of the first time domain resource.

With reference to any one of the tenth aspect or the first to the third possible implementations of the tenth aspect, in a fourth possible implementation, after completely sending the second-type control information and the scheduled data of the second-type control information, the sending module is further configured to: continue to send the first-type control information and/or the scheduled data of the first-type control information in the first time domain resource; or resend the first-type control information and/or the scheduled data of the first-type control information in the first time domain resource.

With reference to any one of the tenth aspect or the first to the fourth possible implementations of the tenth aspect, in a fifth possible implementation, the first time domain resource includes J child time domain resource groups, and each child time domain resource group includes at least one child time domain resource, where J is a positive integer not less than 1.

With reference to the fifth possible implementation of the tenth aspect, in a sixth possible implementation, the sending module is specifically configured to:

send the second-type control information and the scheduled data of the second-type control information in at least two child time domain resource groups.

With reference to any one of the tenth aspect or the first to the sixth possible implementations of the tenth aspect, in a seventh possible implementation, the transmit end includes an in-vehicle device or a roadside unit.

Correspondingly, an eleventh aspect of the present invention further provides a transmit end, where the transmit end includes a processor, a memory, and a network interface, the memory stores a set of programs, and the processor is configured to invoke the program stored in the memory, so that the transmit end performs some or all steps of the tenth aspect.

Correspondingly, a twelfth aspect of the present invention further provides a computer storage medium, where the computer storage medium stores a program, and when executed, the program includes some or all steps of the tenth aspect.

A thirteenth aspect of the present invention further provides a control information transmission method, including:

determining, by a receive end, a first time domain resource of first-type control information and scheduled data of the first-type control information;

determining, by the receive end, a second time domain resource of second-type control information and scheduled data of the second-type control information; and if the receive end detects the second-type control information and the scheduled data in the first time domain resource, receiving the scheduled data of the second-type control information according to the second-type control information.

In a first possible implementation of the thirteenth aspect, the method further includes:

if the receive end detects the second-type control information and the scheduled data in the first time domain resource, determining whether the second-type control information or the scheduled data of the second-type control information meets a preset condition; and if the second-type control information or the scheduled data of the second-type control information meets the preset condition, performing, by the receive end, the step of receiving the scheduled data of the second-type control information according to the second-type control information.

With reference to the first possible implementation of the thirteenth aspect, in a second possible implementation, the preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

With reference to the thirteenth aspect or the first or the second possible implementation of the thirteenth aspect, in a third possible implementation, the second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

With reference to any one of the thirteenth aspect or the first to third possible implementations of the thirteenth aspect, in a fourth possible implementation, the method further includes:

if the receive end is receiving the first-type control information and the scheduled data of the first-type control information when detecting the second-type control information and the scheduled data in the first time domain resource, discarding or stopping receiving the first-type control information and the scheduled data of the first-type control information.

With reference to any one of the thirteenth aspect or the first to the fourth possible implementations of the thirteenth aspect, in a fifth possible implementation, the first time domain resource includes J child time domain resource groups, and each child time domain resource group includes at least one child time domain resource, where J is a positive integer not less than 1.

With reference to any one of the thirteenth aspect or the first to the fifth possible implementations of the thirteenth aspect, in a sixth possible implementation, the receive end includes an in-vehicle device or a roadside unit.

Correspondingly, a fourteenth aspect of the present invention further provides a receive end, including:

a processing module, configured to determine a first time domain resource of first-type control information and scheduled data of the first-type control information, where the processing module is further configured to determine a second time domain resource of second-type control information and scheduled data of the second-type control information;

a receiving module, configured to: if the receive end detects the second-type control information and the scheduled data in the first time domain resource, receive the scheduled data of the second-type control information according to the second-type control information.

In a first possible implementation of the fourteenth aspect, the receiving module is further configured to:

if the receive end detects the second-type control information and the scheduled data in the first time domain resource, determine whether the second-type control information or the scheduled data of the second-type control information meets a preset condition; and if the second-type control information or the scheduled data of the second-type control information meets the preset condition, receive the scheduled data of the second-type control information according to the second-type control information.

With reference to the first possible implementation of the fourteenth aspect, in a second possible implementation, the preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

With reference to the fourteenth aspect or the first or the second possible implementation of the fourteenth aspect, in a third possible implementation, the second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

With reference to any one of the fourteenth aspect or the first to the third possible implementations of the fourteenth aspect, in a fourth possible implementation, the receiving module is further configured to:

if the receive end is receiving the first-type control information and the scheduled data of the first-type control information when detecting the second-type control information and the scheduled data in the first time domain resource, discard or stop receiving the first-type control information and the scheduled data of the first-type control information.

With reference to any one of the fourteenth aspect or the first to the fourth possible implementations of the fourteenth aspect, in a fifth possible implementation, the first time domain resource includes J child time domain resource groups, and each child time domain resource group includes at least one child time domain resource, where J is a positive integer not less than 1.

With reference to any one of the fourteenth aspect or the first to the fifth possible implementations of the fourteenth aspect, in a sixth possible implementation, the receive end includes an in-vehicle device or a roadside unit.

Correspondingly, a fifteenth aspect of the present invention further provides a transmit end, where the transmit end includes a processor, a memory, and a network interface, the memory stores a set of programs, and the processor is configured to invoke the program stored in the memory, so that the transmit end performs some or all steps of the thirteenth aspect.

Correspondingly, a sixteenth aspect of the present invention further provides a computer storage medium, where the computer storage medium stores a program, and when executed, the program includes some or all steps of the thirteenth aspect.

The embodiments of the present invention have the following beneficial effects:

The time domain resource of the control information and the time domain resource of the scheduled data of the control information are not independently configured, the time domain resource of the control information is a subset of the time domain resource of the scheduled data of the control information, and the receive end can detect the control information and the scheduled data of the control information in a same resource pool. This improves a success rate of data detection, shortens a transmission delay, and further improves reliability of a communications system compared with the prior art in which the receive end respectively detects the control information and the scheduled data in two resource pools.

BRIEF DESCRIPTION OF DRAWINGS

To describe the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

This section first describes some basic concepts in each embodiment of the present invention.

Figure 1:
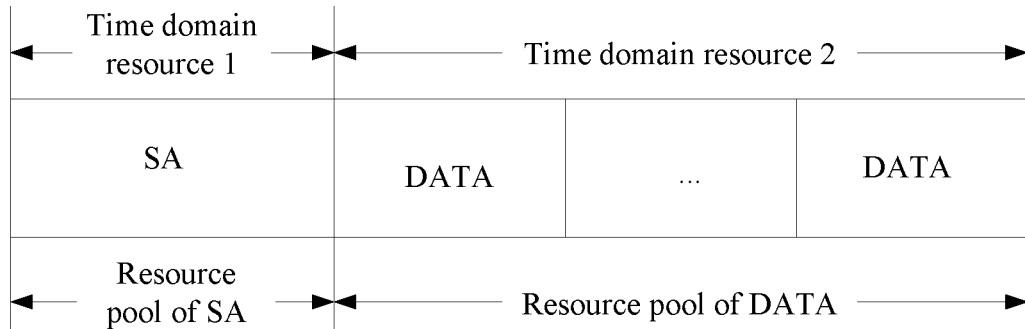
FIG. 1 shows a diagram of a relationship between control information and scheduled data of the control information in existing D2D communication.
Figure 2:
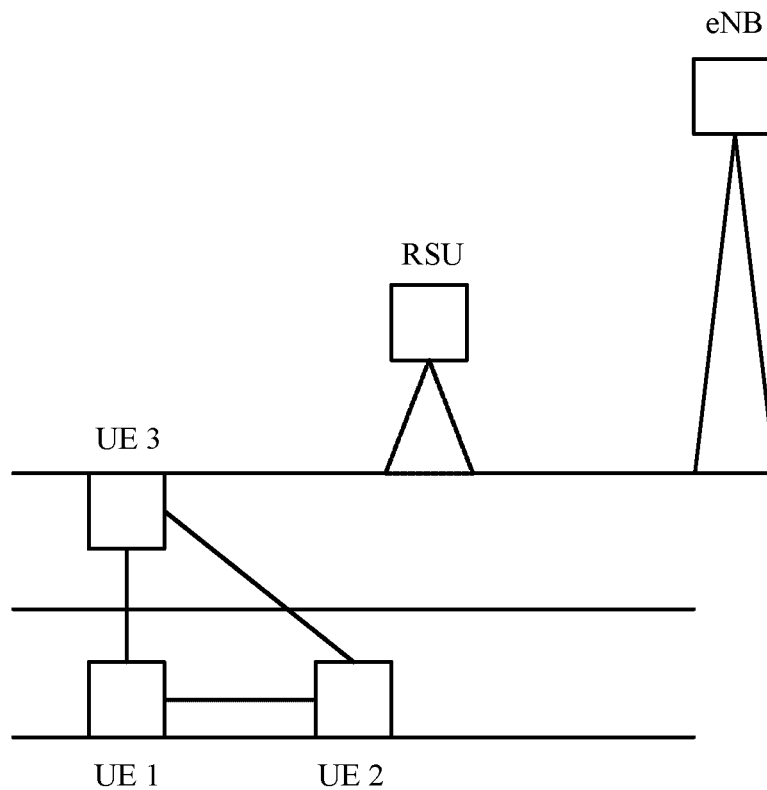
FIG. 2 shows a schematic diagram of the Internet of Vehicles.

The present invention is applied to various communication scenarios, in particular, to a scenario that requires relatively high reliability. The Internet of Vehicles is used as an example in the embodiments of the present invention. As shown in FIG. 2, the Internet of Vehicles scenario may include:

at least one in-vehicle device (that is, UE 1, UE 2, and UE 3), and the in-vehicle devices may communicate with each other. During communication, a shared frequency spectrum such as 2 GHz of a cellular link may be used; or an intelligent traffic frequency spectrum may be used, for example, a frequency spectrum near 5.9 GHz or a frequency spectrum of another country such as a Japanese frequency spectrum of 700 MHz. This is not limited in the present invention. A technology of mutual communication between in-vehicle devices may be enhanced based on the LTE protocol, or may be enhanced based on a D2D technology. Mutual communication between in-vehicle devices may be a one-to-one unicast link, or may be a one-to-many multicast link. This is not limited in the present invention.

The in-vehicle device may be a personal computer, a tablet computer, a smartphone, and the like, or may be a device unit mounted in a vehicle.

One or more roadside units (RSU) are configured to communicate with each in-vehicle device and/or each base station device, or may be used for mutual communication between RSUs.

One or more base station devices are configured to communicate with each in-vehicle device and each roadside unit. The base station device may be a base station (BTS) in GSM or CDMA, may be a base station (NodeB, NB) in WCDMA, or may be an evolved NodeB (Evolutional Node B, eNB) in LTE. It should be noted that the base station device is optional, and if there is a base station device, there is a scenario having network coverage, or if there is no base station device, there is a scenario having no network coverage.

In the embodiments of the present invention, a transmit end may include an in-vehicle device or a roadside unit, and a receive end may include an in-vehicle device or a roadside unit. According to a control information transmission method in the embodiments of the present invention, reliability of a communications system can be improved. Detailed description is given below separately by using embodiments corresponding to FIG. 3 and FIG. 6.

Figure 3:
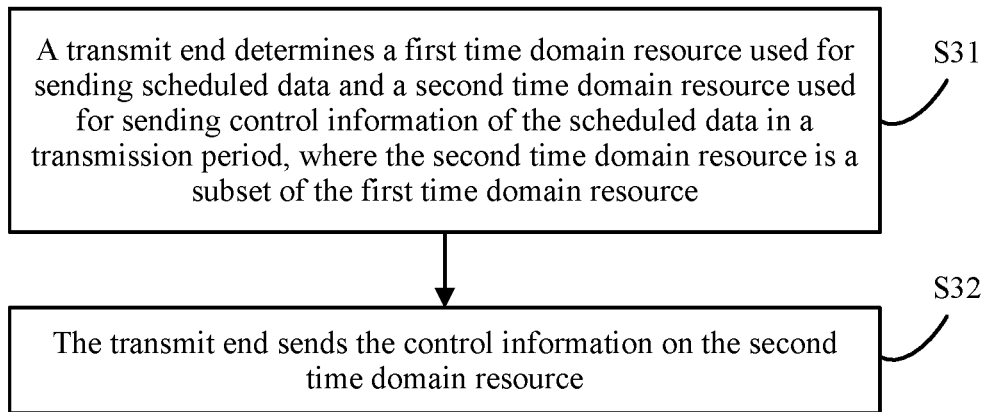
FIG. 3 is a schematic flowchart of a control information transmission method according to an embodiment of the present invention.

Referring to FIG. 3, FIG. 3 is a schematic flowchart of a control information transmission method according to an embodiment of the present invention. This embodiment of the present invention is described from a perspective of a transmit end. As shown in FIG. 3, the method includes the following steps.

Step S31: A transmit end determines a first time domain resource used for sending scheduled data and a second time domain resource used for sending control information of the scheduled data in a transmission period, where the second time domain resource is a subset of the first time domain resource.

Specifically, the transmit end determines the first time domain resource in a preset indication manner from a time domain resource provided by a system, and determines the second time domain resource in the preset indication manner from the first time domain resource. The preset indication manner includes but is not limited to a bit mapping value, a predefined field, a table indication, and a length type value indication, and the bit mapping value is used as an example for corresponding description in this embodiment of the present invention.

It is assumed that a transmission period of the scheduled data is 320 ms, that is, the transmission period includes 320 subframes. However, not all the 320 subframes are used for device-to-device communication. The transmit end may determine a subframe used for device-to-device communication from the 320 subframes according to a signaling indication, and then determine a data subframe used for transmitting data of the transmit end from the subframe used for device-to-device communication. Herein, the determined data subframes form the first time domain resource.

The bit mapping value is used as an example of the preset indication manner, and the transmit end may determine the first time domain resource by using a time resource pattern (TRP) whose length is S from the time domain resource provided by the system. S is signaling configured or predefined. A basic unit of the time domain resource in the present invention may be described by using a subframe, a length of time occupied by the subframe is predefined, and a value of the length of time may be similar to a length of 1 ms in the current LTE protocol, or may be 10 ms, 0.5 ms, 0.1 ms, or the like. This is not limited in the present invention. In this embodiment of the present invention, for ease of description, a length of 1 ms is used as an example for description.

Figure 4:
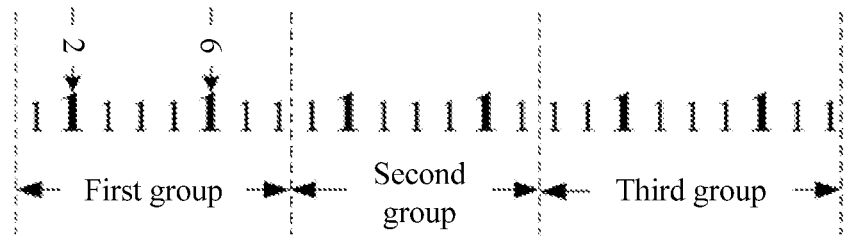
FIG. 4 shows a schematic diagram of bit mapping.

It is assumed that 24 subframes in the 320 subframes may be used for device-to-device communication, and S=8, that is, the 24 subframes are classified into three groups, and each group indicates a data subframe by using eight bits. As shown in FIG. 4, in a first group, if a second subframe and a sixth subframe may be used for transmitting the data of the transmit end, the remaining two groups that are obtained by means of division by using S as a unit appear at a same location. One group herein may be referred to as one child time domain resource. K indicates a quantity of data subframes in each child time domain resource that are used for transmitting the data of the transmit end, K is a positive integer not less than 1, and a value of K may be signaling configured or predefined.

Figure 5A:
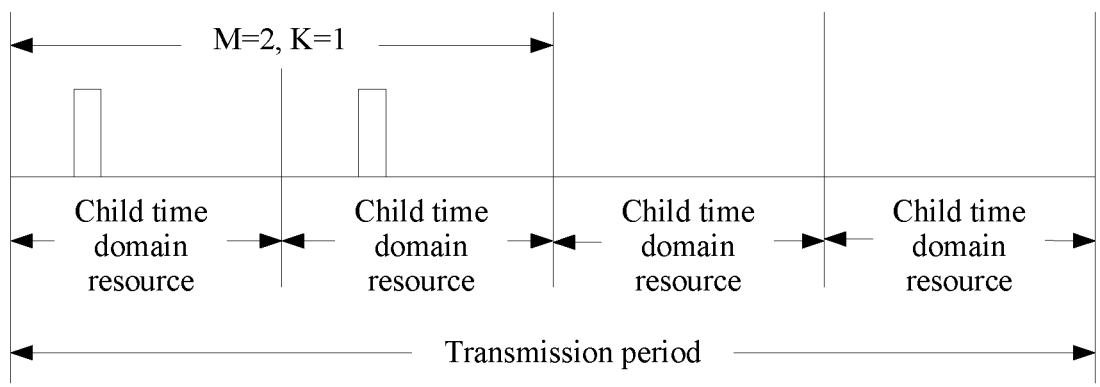
FIG. 5a shows a schematic resource diagram of a piece of control information.
Figure 5B:
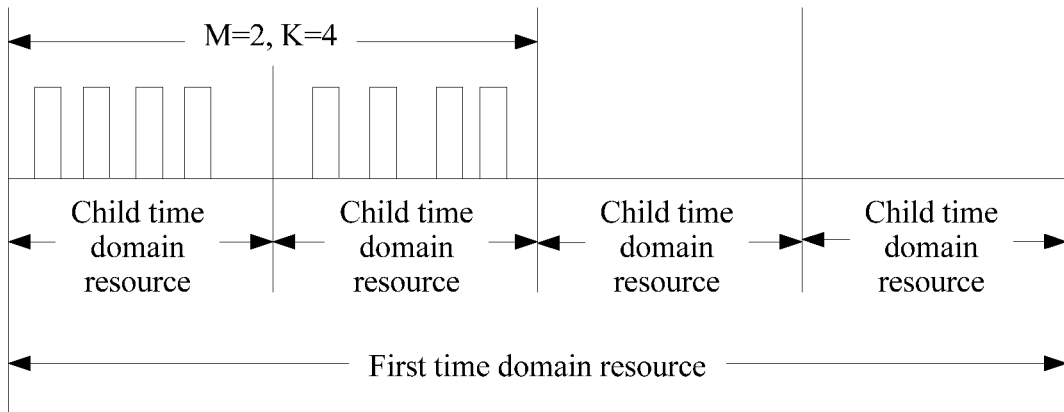
FIG. 5b shows a schematic resource diagram of another piece of control information.

In an optional implementation, the second time domain resource may include M child time domain resources, and each child time domain resource includes K subframes used for sending the control information, where M is a positive integer not less than 1, and a value of M may be signaling configured or predefined. If M=2, and K=1, a schematic resource diagram of control information may be shown in FIG. 5a. If M=2, and K=4, a schematic resource diagram of control information may be shown in FIG. 5b.

Figure 5C:
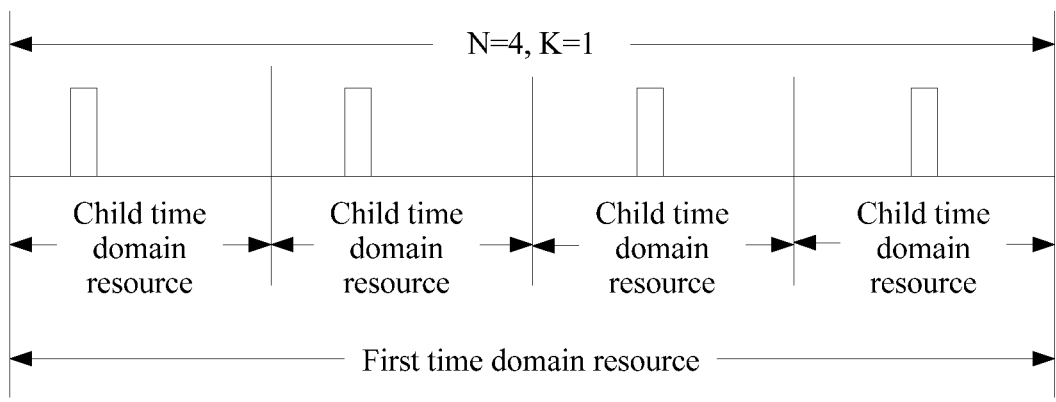
FIG. 5c shows a schematic resource diagram of another piece of control information.
Figure 5D:
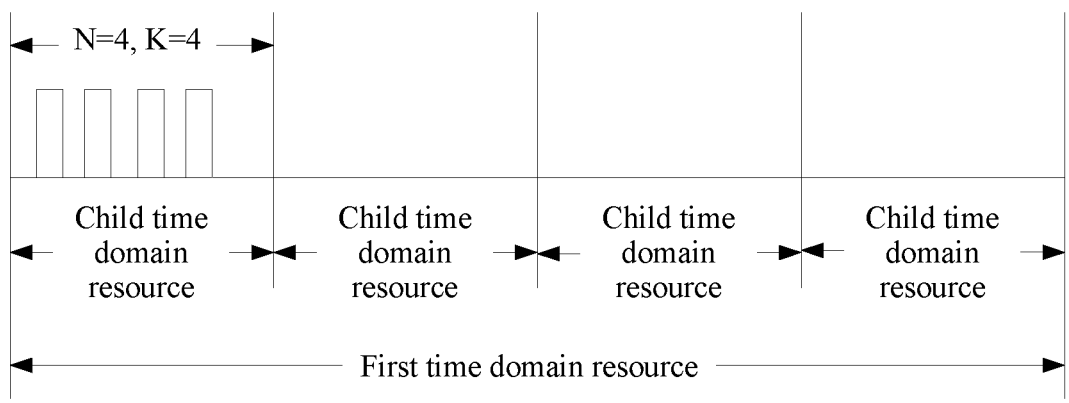
FIG. 5d shows a schematic resource diagram of another piece of control information.

In another optional implementation, the second time domain resource includes N subframes used for sending the control information, where N is a positive integer not less than 1, and a value of N may be signaling configured or predefined. If N=4, and K=1, a schematic resource diagram of control information may be shown in FIG. 5c, that is, the second time domain resource includes four child time domain resources. If N=4, and K=4, a schematic resource diagram of control information may be shown in FIG. 5d, that is, the second time domain resource includes one child time domain resource.

Further, a start subframe of the second time domain resource is determined after a start subframe of the first time domain resource is offset by using a preset offset value. The transmit end determines the start subframe of the second time domain resource by using the preset offset value, so that a data conflict is reduced.

In an optional implementation, the preset offset value is 0, that is, the transmit end determines a start subframe of a first child time domain resource of the first time domain resource as the start subframe of the second time domain resource. Preset offset values in FIG. 5a, FIG. 5b, FIG. 6a, and FIG. 6b are all 0.

In another optional implementation, the preset offset value includes Q candidate values, where Q is a positive integer not less than 1.

If Q=1, it indicates that only one candidate value is used as an offset value. If the candidate value is 1, the transmit end determines a start subframe of a second child time domain resource of the first time domain resource as the start subframe of the second time domain resource.

If Q=3, it indicates that three candidate values are used as offset values. If the candidate value is 1, 2, or 3, the transmit end may determine a start subframe of the first, the second, or a third child time domain resource of the first time domain resource as the start subframe of the second time domain resource. The transmit end may select one candidate value from multiple candidate values to determine the start subframe, so that a data conflict is further reduced.

Further, the transmit end may further determine the start subframe of the second time domain resource with reference to a preset step size sc-step and a time resource sc-len occupied by the control information. If the transmission period of the scheduled data is still 320 ms, sc-len=40 ms, sc-step=80 ms, and an offset value offset=0, a start subframe of the control information in each transmission period may have {0, 40 ms, 120 ms, 200 ms, 280 ms}.

For a receive end, the receive end needs to determine, according to the preset offset value or further according to the preset offset value, the sc-step, and the sc-len, the start subframe of the second time domain resource of the control information, and detect the control information at a possible location of the start subframe.

In this embodiment of the present invention, the time domain resource of the control information and the time domain resource of the scheduled data of the control information are not independently configured, the time domain resource of the control information is a subset of the time domain resource of the scheduled data of the control information, and the receive end can detect the control information and the scheduled data of the control information in a same resource pool. This improves a success rate of data detection, shortens a transmission delay, and further improves reliability of a communications system compared with the prior art in which the receive end respectively detects the control information and the scheduled data in two resource pools. Further, the second time domain resource used for sending the control information is included in the first time domain resource used for sending the scheduled data of the control information, and a specific-size set of the second time domain resource is configured by using a parameter. This not only reduces an error rate of the control information, but also limits a quantity of buffered data subframes of the scheduled data, thereby reducing an amount of data buffered by the receive end while ensuring performance.

Step S32: The transmit end sends the control information on the second time domain resource, where the control information includes a parameter used to instruct a receive end to receive the scheduled data. The parameter includes but is not limited to time domain location indication information, frequency domain location indication information, a modulation and coding scheme, and timing advance indication information of the scheduled data of the control information.

If the second time domain resource includes M child time domain resources and each child time domain resource includes K subframes used for sending the control information, the transmit end may send the control information in L subframes of the second time domain resource in a predefined manner, where L=M*K.

If the second time domain resource includes N subframes used for sending the control information, the transmit end may send the control information in the N subframes for multiple times in a predefined manner.

Specifically, the transmit end may determine a time domain location of the control information from the second time domain resource in a predefined time domain location determining manner, and determine a frequency domain location of the control information from a frequency domain resource set of the second time domain resource in a predefined frequency domain location determining manner, and the transmit end sends the control information by using the determined time domain location and the determined frequency domain location.

The predefined time domain location determining manner includes but is not limited to determining by using a predefined mapping table, determining by using a predefined formula, or determining by using a predefined rule.

The transmit end may send the control information for one time or multiple times in the second time domain resource. Sending for multiple times is sending a same data packet of control information for multiple times in a same transmission period. It should be noted that a quantity of times of sending for multiple times may be signaling configured or predefined.

It is assumed that when the control information is sent for two times, the predefined time domain location determining manner is determining by using a predefined formula, and time-frequency locations for a first-time sending and a second-time sending are determined respectively according to the following formulas:

Formulas for a time-frequency location for the first-time sending:

$$n_{t1} = \mathrm{mod}(s, N_t)$$

$$n_{f1} = \mathrm{floor}(s/N_t)$$

Formulas for determining a time-frequency location for the second-time sending:

$$n_{t2} = \mathrm{mod}(s + \mathrm{mod}(\mathrm{floor}(s/N_t), N_s) + 1, N_t)$$

$$n_{f2} = \mathrm{floor}(N_f/2) + n_{f1}, \text{ where}$$

s is a frequency domain location occupied by the scheduling information when the scheduling information is sent for the last time in the transmission period. If the transmit end sends the scheduling information for the first time in the transmission period, the transmit end may determine, according to signaling configuration or a predefined indication, a subframe and a frequency domain location that are occupied by the scheduling information when the scheduling information is sent for the first time.

$N_t$ is a total quantity of subframes used for transmitting the control information in the first time domain resource, $N_s = N_t - 1$, and $N_t$ may be determined according to M*K, or may be determined according to N.

$N_f$ is a resource pool of a frequency domain resource, and is determined according to the frequency domain resource set of the second time domain resource.

In an optional implementation, the frequency domain resource set is determined according to a frequency domain resource in a system bandwidth.

In another optional implementation, the frequency domain resource set is determined in at least one of the following manners:

Manner 1: The frequency domain resource set is determined by an indication identifier in the control information.

In an existing D2D technology, the control information includes an identifier, and the identifier is used to indicate a group target identifier of the scheduled data. In the present invention, in addition to being an identifier in the prior art, the identifier may be an identifier indicating a service type of the scheduled data packet, an identifier indicating a service priority of the scheduled data packet, an identifier indicating a packet size of the scheduled data packet, or the like. In conclusion, the identifier may be an identifier indicated in the control information. The identifier ID is used as an input variable to determine a frequency domain location of the control information.

Manner 2: The frequency domain resource set is determined by a subframe number of a subframe in which the control information is located. The subframe number herein may be a subframe number on a Uu link, or may be a subframe number on a device-to-device link. However, regardless of either type of the subframe number, a receiver can obtain the subframe number in advance before detecting the control information. The subframe number is used as an input variable to determine a frequency domain location of the control information.

Manner 3: The frequency domain resource set is determined by a radio frame number of a subframe in which the control information is located. Likewise, in addition to the subframe number, the frequency domain resource set may further be determined by using a radio frame number. The radio frame number herein may be a radio frame number on a Uu link, or may be a radio frame number on a device-to-device link. However, regardless of either type of the radio frame number, a receiver can obtain the radio frame number in advance before detecting the control information. The subframe number is used as an input variable to determine a frequency domain location of the control information.

Manner 4: The frequency domain resource set is determined by a carrier identifier of a carrier in which the control information is located. When there are multiple carriers on the Uu link, the carrier identifier is an identifier on a scheduled and/or configured Uu carrier of the device-to-device link. When there are multiple carriers on the device-to-device link, the carrier identifier is an identifier of a carrier that is used for transmitting current control information and that is on the device-to-device link. The carrier identifier is used as an input variable to determine a frequency domain location of the control information.

In the foregoing various implementations, if the input variable is x, a manner of determining a location of the control information in a frequency domain is f(x), f is a predefined function, and a subset of the frequency domain location of the control information may be determined by using the function.

For example:

y=mod(a*x+b, N), or y=a*x+b, or y=mod(floor(x/a)+b, N), where floor indicates rounding down, or y=mod(round (x/a)+b, N), where round indicates rounding up.

A value of y is a calculated index value of a frequency domain location in the system bandwidth, and N indicates a set of N frequency domain locations. For example, if y=0, the control information is in a $0^{th}$ subband of the system bandwidth; if y=1, the control information is in a first subband of the system bandwidth; if y=N-1, the control information is in an $(N-1)^{th}$ subband of the system bandwidth. Each subband occupies only a part of the system bandwidth.

Manner 5: The frequency domain resource set is determined in a preset manner in which the control information is mapped to a physical resource block. The preset manner includes mapping to only an odd or even numbered physical resource block (PRB), mapping to only a PRB whose number is a multiple of a predefined constant N, or the like.

The control information is sent in the second time domain resource, that is, the control information is sent in the first time domain resource, and the first time domain resource is used for sending the scheduled data of the control information. That is, the control information is sent in a subframe in which the scheduled data is located. On one carrier, a bandwidth of the subframe in which the scheduled data is located may be a maximum of 20 MHz, that is, the control information may be sent at any location of the 20 MHz system bandwidth on one carrier. For the receiver, the receiver needs to first detect the control information by means of blind detection, and then can receive the scheduled data of the control information. Therefore, a method for reducing the control information detection needs to be considered in the entire 20 MHz system bandwidth on one carrier, to reduce a quantity of times of blind detection for detecting the control information. In the present invention, the location of the control information in the system bandwidth is associated by using a specific parameter or a predefined rule, and the control information can occupy only a determined part of the system bandwidth on each subframe, so that complexity of blind detection is reduced.

Further, a subframe that is of the second time domain resource and that is occupied by the control information in the transmission period is completely the same as, partially the same as, or totally different from a subframe that is of the first time domain resource and that is occupied by the scheduled data. It should be noted that a location relationship between the control information and the scheduled data of the control information in the frequency domain may be separate, consecutive, or interleaved. This is not limited in the present invention.

Figure 6A:
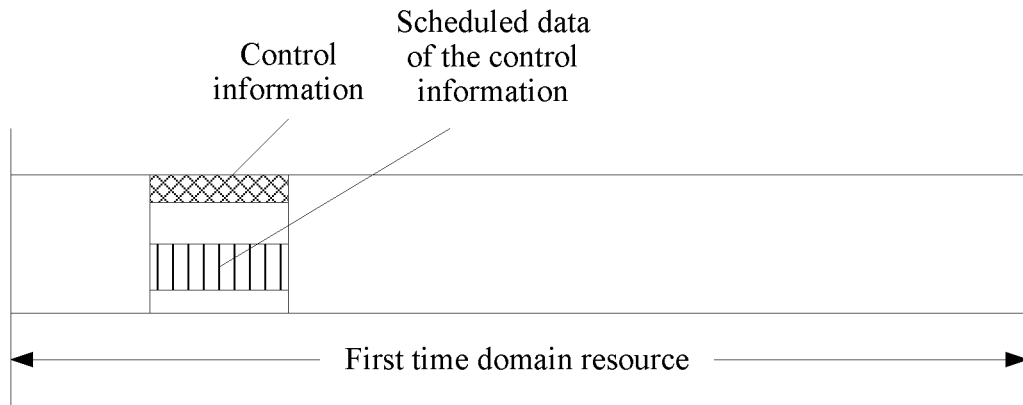
FIG. 6a shows a diagram of a frequency domain location relationship between a piece of control information and scheduled data of the control information.

The subframe that is of the second time domain resource and that is occupied by the control information is completely the same as the subframe that is of the first time domain resource and that is occupied by the scheduled data. In this case, the control information and the scheduled data of the control information are sent for same times. It is assumed that the control information is sent for one time in one transmission period, and the control information and the scheduled data of the control information occupy a same subframe, as shown in FIG. 6*a*.

Figure 6B:
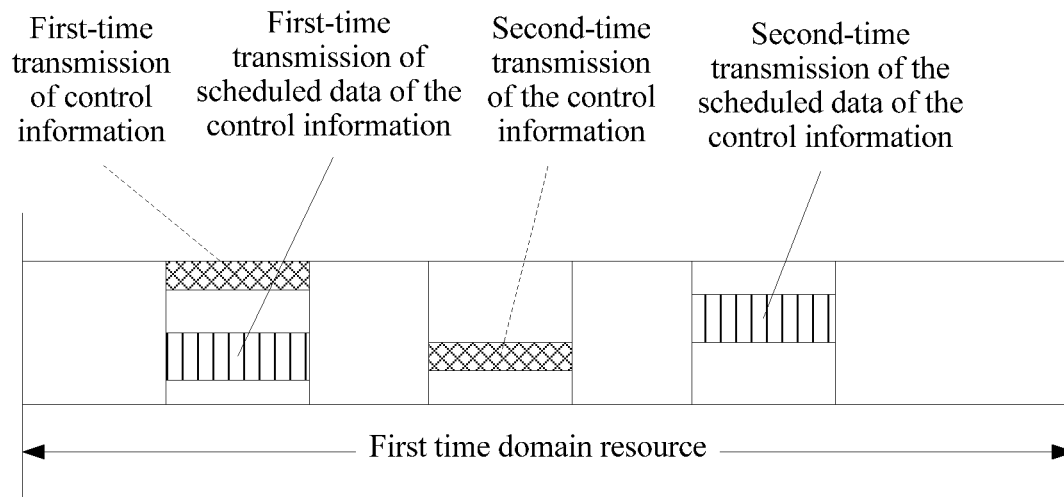
FIG. 6b shows a diagram of a frequency domain location relationship between another piece of control information and scheduled data of the control information.

The subframe that is of the second time domain resource and that is occupied by the control information is partially the same as the subframe that is of the first time domain resource and that is occupied by the scheduled data. In this case, the control information and the scheduled data of the control information may be sent for same or different times. It is assumed that the control information and the scheduled data of the control information are sent for same times, the control information is sent for two times in one transmission period, one piece of control information and scheduled data of the control information occupy a same subframe, and another piece of control information and scheduled data of the control information occupy different subframes, as shown in FIG. 6*b*.

Figure 6C:
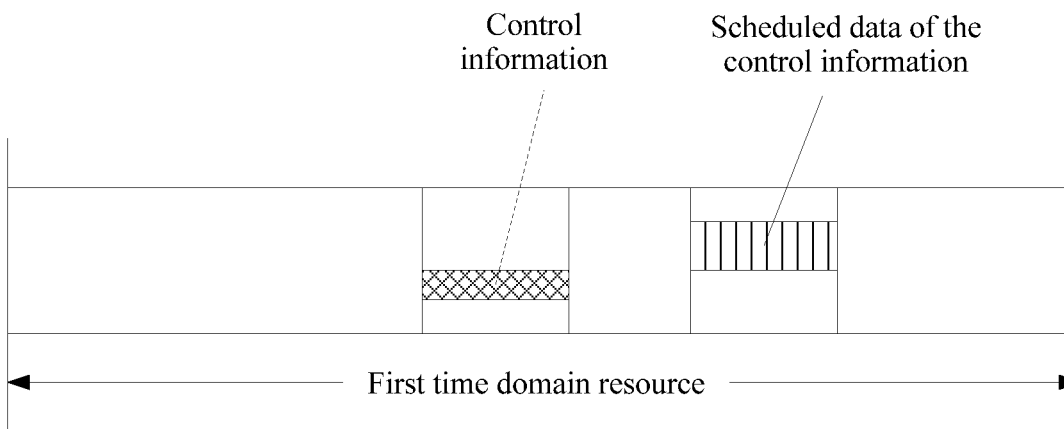
FIG. 6c shows a diagram of a frequency domain location relationship between still another piece of control information and scheduled data of the control information.

The subframe that is of the second time domain resource and that is occupied by the control information is totally different from the subframe that is of the first time domain resource and that is occupied by the scheduled data. In this case, the control information and the scheduled data of the control information may be sent for same or different times. It is assumed that the control information and the scheduled data of the control information are sent for same times, the control information is sent for one time in one transmission period, and the control information and the scheduled data of the control information occupy different subframes, as shown in FIG. 6*c*.

It should be noted that regardless of a relative relationship between a control subframe (that is, a subframe used for sending the control information) and a data subframe in a time domain, to detect the scheduled data of the transmit end, the receive end needs to first correctly detect the control information. For example, the control information is sent for two times, and if the receive end cannot detect the control information at a resource location at which the control information is sent for the first time, the receive end needs to detect the control information at a location at which the control information is transmitted again. Regardless of whether the control information and the scheduled data of the control information are sent in a same subframe, because the control information is not detected at a location at which the control information appears for the first time, at worst, the receive end needs to buffer all subframes in the resource pool in which the entire to-be-detected data information is located. However, in the method in the present invention, the second time domain resource in which the control information is located is configured on the first time domain resource, and the receive end needs to buffer only subframe data with a size of the second time domain resource at most, so that complexity of buffering by the receive end is reduced, and detection performance is not affected.

In the embodiment shown in FIG. 3, the time domain resource of the control information and the time domain resource of the scheduled data of the control information are not independently configured, the time domain resource of the control information is a subset of the time domain resource of the scheduled data of the control information, and the receive end can detect the control information and the scheduled data of the control information in a same resource pool. This improves a success rate of data detection, shortens a transmission delay, and further improves reliability of a communications system compared with the prior art in which the receive end respectively detects the control information and the scheduled data in two resource pools.

Figure 7:
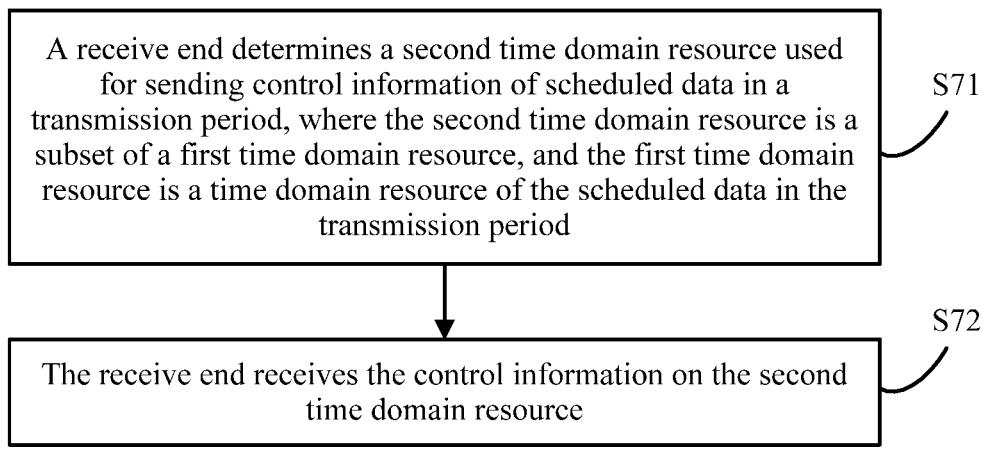
FIG. 7 is a schematic flowchart of another control information transmission method according to an embodiment of the present invention.

Referring to FIG. 7, FIG. 7 is a schematic flowchart of another control information transmission method according to an embodiment of the present invention. This embodiment of the present invention is described from a perspective of a receive end. As shown in FIG. 7, the method includes the following steps.

Step S71: A receive end determines a second time domain resource used for sending control information of scheduled data in a transmission period, where the second time domain resource is a subset of a first time domain resource, and the first time domain resource is a time domain resource of the scheduled data in the transmission period.

Specifically, the transmit end may determine the second time domain resource from the first time domain resource in a preset indication manner. The preset indication manner includes but is not limited to a bit mapping value, a predefined field, a table indication, and a length type value indication, and the bit mapping value is used as an example for corresponding description in this embodiment of the present invention.

It should be noted that, for details about how the receive end determines the second time domain resource from the first time domain resource in the preset indication manner, refer to the foregoing description corresponding to the transmit end side, and details are not described herein again.

A start subframe of the second time domain resource is determined after a start subframe of the first time domain resource is offset by using a preset offset value.

In an optional implementation, the preset offset value is 0, that is, the receive end determines a start subframe of a first child time domain resource of the first time domain resource as the start subframe of the second time domain resource. Preset offset values in FIG. 5*a*, FIG. 5*b*, FIG. 5*c*, and FIG. 5*d* are all 0.

In another optional implementation, the preset offset value includes Q candidate values, where Q is a positive integer not less than 1.

If Q=1, it indicates that only one candidate value is used as an offset value. If the candidate value is 1, the receive end determines a start subframe of a second child time domain resource of the first time domain resource as the start subframe of the second time domain resource.

If Q=3, it indicates that three candidate values are used as offset values. If the candidate value is 1, 2, or 3, the receive end may determine a start subframe of the first, the second, or a third child time domain resource of the first time domain resource as the start subframe of the second time domain resource.

Further, the receive end may further determine the start subframe of the second time domain resource with reference to a preset step size sc-step and a time resource sc-len occupied by the control information. If the transmission period of the scheduled data is still 320 ms, sc-len=40 ms, sc-step=80 ms, and an offset value offset=0, a start subframe of the control information in each transmission period may have {0, 40 ms, 120 ms, 200 ms, 280 ms}.

The receive end needs to determine, according to the preset offset value or further according to the preset offset value, the sc-step, and the sc-len, the start subframe of the second time domain resource of the control information, and detect the control information at a possible location of the start subframe.

In this embodiment of the present invention, the time domain resource of the control information and the time domain resource of the scheduled data of the control information are not independently configured, the time domain resource of the control information is a subset of the time domain resource of the scheduled data of the control information, and the receive end can detect the control information and the scheduled data of the control information in a same resource pool. This improves a success rate of data detection, shortens a transmission delay, and further improves reliability of a communications system compared with the prior art in which the receive end respectively detects the control information and the scheduled data in two resource pools.

In an optional implementation, the second time domain resource includes M child time domain resources, and each child time domain resource includes K subframes used for sending the control information, where M and K are signaling configured or predefined, and M and K are positive integers not less than 1. If M=2, and K=1, a schematic resource diagram of control information may be shown in FIG. 5a. If M=2, and K=4, a schematic resource diagram of control information may be shown in FIG. 5b.

In another optional implementation, the second time domain resource includes N subframes used for sending the control information, where N is signaling configured or predefined, and N is a positive integer not less than 1. If N=4, and K=1, a schematic resource diagram of control information may be shown in FIG. 5c, that is, the second time domain resource includes four child time domain resources. If N=4, and K=4, a schematic resource diagram of control information may be shown in FIG. 5d, that is, the second time domain resource includes one child time domain resource.

In this embodiment of the present invention, the second time domain resource used for sending the control information is included in the first time domain resource used for sending the scheduled data of the control information, and a specific-size set of the second time domain resource is configured by using a parameter. This not only reduces an error rate of the control information, but also limits a quantity of buffered data subframes of the scheduled data, thereby reducing an amount of data buffered by the receive end while ensuring performance.

Step S72: The receive end receives the control information on the second time domain resource, where the control information includes a parameter used to instruct the receive end to receive the scheduled data. The parameter includes but is not limited to time domain location indication information, frequency domain location indication information, a modulation and coding scheme, and timing advance indication information of the scheduled data of the control information.

Optionally, the receive end may determine a time domain location of the control information in the second time domain resource in a predefined time domain location determining manner, and detect and receive the control information at the determined time domain location according to a frequency domain resource set. The transmit end may send the control information for one time or multiple times in the second time domain resource, and a quantity of times of sending for multiple times may be signaling configured for or predefined to the receive end.

The predefined time domain location determining manner includes but is not limited to determining by using a predefined mapping table, determining by using a predefined formula, or determining by using a predefined rule.

It is assumed that the control information is sent for two times, and the predefined time domain location determining manner is determining by using a predefined formula. The receive end may determine time domain locations used in a first-time receiving and a second-time receiving respectively according to the following formulas:

A formula for a time domain location for the first-time receiving:

$n_{t1}=\mod(s,N_t)$

A formula for a time domain location for the second-time receiving:

$n_{t2}=\mod(s+\mod(\mathrm{floor}(s/N_t), N_s)+1,N_t)$, where s is a frequency domain location occupied by the scheduling information when the scheduling information is sent for the last time in the transmission period. If the transmit end sends the scheduling information for the first time in the transmission period, the transmit end may determine, according to signaling configuration or a predefined indication, a subframe and a frequency domain location that are occupied by the scheduling information when the scheduling information is sent for the first time.

$N_t$ a total quantity of subframes used for transmitting the control information in the first time domain resource, $N_s=N_t-1$, and $N_t$ may be determined according to M*K, or may be determined according to N.

The receive end separately detects the control information at the time domain location of the first-time receiving and at the time domain location of the second-time receiving according to the frequency domain resource set.

In an optional implementation, the receive end may determine the frequency domain resource set according to a frequency domain location in a system bandwidth.

In another optional implementation, the frequency domain resource set is determined in at least one of the following manners:

Manner 1: The frequency domain resource set is determined by an indication identifier in the control information.

In an existing D2D technology, the control information includes an identifier, and the identifier is used to indicate a group target identifier of the scheduled data. In the present invention, in addition to being an identifier in the prior art, the identifier may be an identifier indicating a service type of the scheduled data packet, an identifier indicating a service priority of the scheduled data packet, an identifier indicating a packet size of the scheduled data packet, or the like. In conclusion, the identifier may be an identifier indicated in the control information. The identifier ID is used as an input variable to determine a frequency domain location of the control information.

Manner 2: The frequency domain resource set is determined by a subframe number of a subframe in which the control information is located. The subframe number herein may be a subframe number on a Uu link, or may be a subframe number on a device-to-device link. However, regardless of either type of the subframe number, a receiver can obtain the subframe number in advance before detecting the control information. The subframe number is used as an input variable to determine a frequency domain location of the control information.

Manner 3: The frequency domain resource set is determined by a radio frame number of a subframe in which the control information is located. Likewise, in addition to the subframe number, the frequency domain resource set may further be determined by using a radio frame number. The radio frame number herein may be a radio frame number on a Uu link, or may be a radio frame number on a device-to-device link. However, regardless of either type of the radio frame number, a receiver can obtain the radio frame number in advance before detecting the control information. The subframe number is used as an input variable to determine a frequency domain location of the control information.

Manner 4: The frequency domain resource set is determined by a carrier identifier of a carrier in which the control information is located. When there are multiple carriers on the Uu link, the carrier identifier is an identifier on a scheduled and/or configured Uu carrier of the device-to-device link. When there are multiple carriers on the device-to-device link, the carrier identifier is an identifier of a carrier that is used for transmitting current control information and that is on the device-to-device link. The carrier identifier is used as an input variable to determine a frequency domain location of the control information.

In the foregoing various implementations, if the input variable is x, a manner of determining a location of the control information in a frequency domain is f(x), f is a predefined function, and a subset of the frequency domain location of the control information may be determined by using the function.

For example:

y=mod(a*x+b, N), or y=a*x+b, or y=mod(floor(x/a)+b, N), where floor indicates rounding down, or y=mod(round (x/a)+b, N), where round indicates rounding up.

A value of y is a calculated index value of a frequency domain location in the system bandwidth, and N indicates a set of N frequency domain locations. For example, if y=0, the control information is in a $0^{th}$ subband of the system bandwidth; if y=1, the control information is in a first subband of the system bandwidth; if y=N−1, the control information is in an $(N-1)^{th}$ subband of the system bandwidth. Each subband occupies only a part of the system bandwidth.

Manner 5: The frequency domain resource set is determined in a preset manner in which the control information is mapped to a physical resource block. The preset manner includes mapping to only an odd or even numbered PRB, mapping to only a PRB whose number is a multiple of a predefined constant N, or the like.

The control information is sent in the second time domain resource, that is, the control information is sent in the first time domain resource, and the first time domain resource is used for sending the scheduled data of the control information. That is, the control information is sent in a subframe in which the scheduled data is located. On one carrier, a bandwidth of the subframe in which the scheduled data is located may be a maximum of 20 MHz, that is, the control information may be sent at any location of the 20 MHz system bandwidth on one carrier. For the receiver, the receiver needs to first detect the control information by means of blind detection, and then can receive the scheduled data of the control information. Therefore, a method for reducing the control information detection needs to be considered in the entire 20 MHz system bandwidth on one carrier, to reduce a quantity of times of blind detection for detecting the control information. In the present invention, the location of the control information in the system bandwidth is associated by using a specific parameter or a predefined rule, and the control information can occupy only a determined part of the system bandwidth on each subframe, so that complexity of blind detection is reduced.

The receive end detects the control information at a determined sending location, and receives the scheduled data of the control information according to a parameter of the control information. It should be noted that a person skilled in the art may understand how the receive end receives the scheduled data of the control information according to the parameter of the control information, and details are not described herein.

Further, the receive end successively detects the control information at the determined sending location, and detects the control information at a next sending location if the receive end does not detect the control information at a current sending location. Specifically, if the transmit end sends the control information for multiple times in the second time domain resource, the receive end may detect the control information at a corresponding sending location, and directly detects the control information at a next sending location if the receive end does not detect the control information at a current sending location.

It should be noted that regardless of a relative relationship between a control subframe (that is, a subframe used for sending the control information) and a data subframe in a time domain, to detect the scheduled data of the transmit end, the receive end needs to first correctly detect the control information. For example, the control information is sent for two times, and if the receive end cannot detect the control information at a resource location at which the control information is sent for the first time, the receive end needs to detect the control information at a location at which the control information is transmitted again. Regardless of whether the control information and the scheduled data of the control information are sent in a same subframe, because the control information is not detected at a location at which the control information appears for the first time, at worst, the receive end needs to buffer all subframes in the resource pool in which the entire to-be-detected data information is located. However, in the method in the present invention, the second time domain resource in which the control information is located is configured on the first time domain resource, and the receive end needs to buffer only subframe data with a size of the second time domain resource at most, so that complexity of buffering by the receive end is reduced, and detection performance is not affected.

In the embodiment shown in FIG. 7, the time domain resource of the control information and the time domain resource of the scheduled data of the control information are not independently configured, the time domain resource of the control information is a subset of the time domain resource of the scheduled data of the control information, and the receive end can detect the control information and the scheduled data of the control information in a same resource pool. This improves a success rate of data detection, shortens a transmission delay, and further improves reliability of a communications system compared with the prior art in which the receive end respectively detects the control information and the scheduled data in two resource pools.

Figure 8:
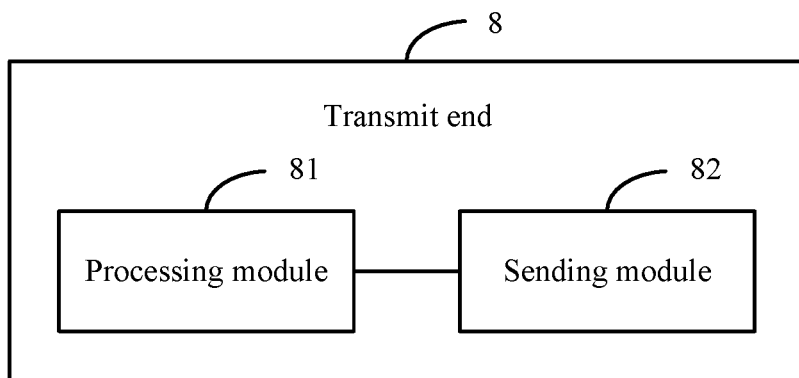
FIG. 8 is a schematic structural diagram of a transmit end according to an embodiment of the present invention.

Referring to FIG. 8, FIG. 8 is a schematic structural diagram of a transmit end according to an embodiment of the present invention. The transmit end 8 may be configured to implement some or all steps in the method embodiment shown with reference to FIG. 3. The transmit end shown in FIG. 8 may include a processing module 81 and a sending module 82.

The processing module 81 is configured to determine a first time domain resource used for sending scheduled data and a second time domain resource used for sending control information of the scheduled data in a transmission period, where the second time domain resource is a subset of the first time domain resource. The preset indication manner includes but is not limited to a bit mapping value, a predefined field, a table indication, and a length type value indication, and the bit mapping value is used as an example for corresponding description in this embodiment of the present invention.

Optionally, the processing module 81 may determine, in a bit mapping manner, the first time domain resource from a time domain resource provided by a system, and the processing module 81 may determine, in the bit mapping manner, the second time domain resource from a resource provided in the second time domain resource.

In an optional implementation, the second time domain resource includes M child time domain resources, and each child time domain resource includes K subframes used for sending the control information, where M and K are signaling configured or predefined, and M and K are positive integers not less than 1.

In another optional implementation, the second time domain resource includes N subframes used for sending the control information, where N is signaling configured or predefined, and N is a positive integer not less than 1.

Further, a start subframe of the second time domain resource is determined after a start subframe of the first time domain resource is offset by using a preset offset value. The processing module 81 determines the start subframe of the second time domain resource by using the preset offset value, so that a data conflict is reduced.

In an optional implementation, the preset offset value is 0, that is, the processing module 81 determines a start subframe of a first child time domain resource of the first time domain resource as the start subframe of the second time domain resource. Preset offset values in FIG. 5a, FIG. 5b, FIG. 5c, and FIG. 5d are all 0.

In another optional implementation, the preset offset value includes Q candidate values, where Q is a positive integer not less than 1.

If Q=1, it indicates that only one candidate value is used as an offset value. If the candidate value is 1, the processing module 81 determines a start subframe of a second child time domain resource of the first time domain resource as the start subframe of the second time domain resource.

If Q=3, it indicates that three candidate values are used as offset values. If the candidate value is 1, 2, or 3, the processing module 81 may determine a start subframe of the first, the second, or a third child time domain resource of the first time domain resource as the start subframe of the second time domain resource. The processing module 81 may select one candidate value from multiple candidate values to determine the start subframe, so that a data conflict is further reduced.

Further, the processing module 81 may further determine the start subframe of the second time domain resource with reference to a preset step size sc-step and a time resource sc-len occupied by the control information. If the transmission period of the scheduled data is still 320 ms, sc-len=40 ms, sc-step=80 ms, and an offset value offset=0, a start subframe of the control information in each transmission period may have {0, 40 ms, 120 ms, 200 ms, 280 ms}.

The sending module 82 is configured to send the control information on the second time domain resource, where the control information includes a parameter used to instruct a receive end to receive the scheduled data. The parameter includes but is not limited to time domain location indication information, frequency domain location indication information, a modulation and coding scheme, and timing advance indication information of the scheduled data of the control information.

If the second time domain resource includes M child time domain resources and each child time domain resource includes K subframes used for sending the control information, the sending module 82 may send the control information in L subframes of the second time domain resource in a predefined manner, where L=M*K.

If the second time domain resource includes N subframes used for sending the control information, the sending module 82 may send the control information in the N subframes for multiple times in a predefined manner.

The sending module 82 may be specifically configured to:
determine a time domain location of the control information from the second time domain resource in a predefined time domain location determining manner, determine a frequency domain location of the control information from a frequency domain resource set of the second time domain resource in a predefined frequency domain location determining manner, and send the control information by using the determined time domain location and the determined frequency domain location.

The frequency domain resource set of the second time domain resource is determined in at least one of the following manners:
determined by an indication identifier in the control information; determined by a subframe number of a subframe in which the control information is located;
determined by a radio frame number of a subframe in which the control information is located;
determined by a carrier identifier of a carrier in which the control information is located; or
determined in a preset manner in which the control information is mapped to a physical resource block.

The preset offset value includes Q candidate values, where Q is signaling configured or predefined, and Q is a positive integer not less than 1.

Further, a subframe that is of the second time domain resource and that is occupied by the control information in the transmission period is completely the same as, partially the same as, or totally different from a subframe that is of the first time domain resource and that is occupied by the scheduled data.

It may be understood that a function of each function module of the transmit end 8 in this embodiment may be specifically implemented according to the methods in the foregoing method embodiments. For details, refer to related descriptions in the method embodiment in FIG. 3, and details are not described herein again.

Figure 9:
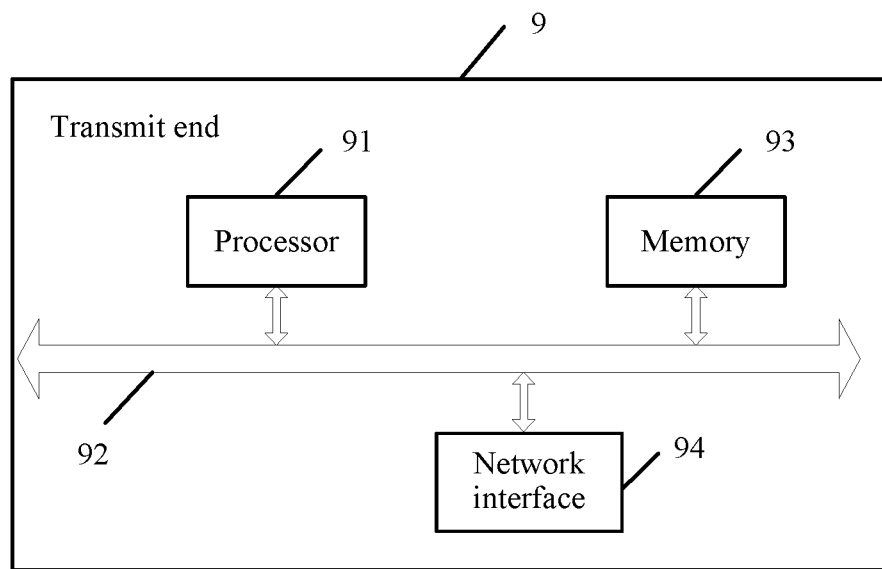
FIG. 9 is a schematic structural diagram of another transmit end according to an embodiment of the present invention.

Referring to FIG. 9, FIG. 9 is a schematic structural diagram of another transmit end according to an embodiment of the present invention. The transmit end provided in this embodiment of the present invention may be configured to implement the method implemented in the foregoing embodiment shown in FIG. 3. For ease of description, only a part related to this embodiment of the present invention is illustrated. For undisclosed specific technical details, refer to the embodiments of the present invention shown in FIG. 3.

As shown in FIG. 9, the transmit end 9 may include: at least one processor 91, for example, a CPU, at least one communications bus 92, a memory 93, and a network interface 94. The communications bus 92 is configured to implement connection and communication between these components. The network interface 94 may include a standard wired interface, a wireless interface (such as a WI-FI interface), and is configured to communicate with an external network. The memory 93 may be a high-speed RAM memory or a non-volatile memory, such as at least one magnetic disk memory. Alternatively, the memory 93 may be at least one storage apparatus located far away from the processor 91.

The memory 93 stores a group of program code, and the processor 91 is configured to invoke the program code stored in the memory 93 and is configured to perform the following operations:

determining a first time domain resource used for sending scheduled data and a second time domain resource used for sending control information of the scheduled data in a transmission period, where the second time domain resource is a subset of the first time domain resource; and sending the control information on the second time domain resource by using the network interface 94, where the control information includes a parameter used to instruct a receive end to receive the scheduled data.

Specifically, the transmit end described in this embodiment of the present invention may be configured to implement some or all procedures in the method embodiment described in the present invention with reference to FIG. 3.

Figure 10:
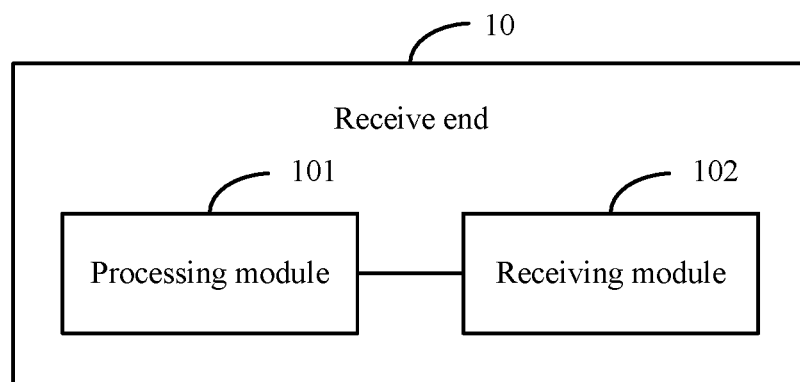
FIG. 10 is a schematic structural diagram of a receive end according to an embodiment of the present invention.

Referring to FIG. 10, FIG. 10 is a schematic structural diagram of a receive end according to an embodiment of the present invention. The receive end 10 may be configured to implement some or all steps in the method embodiment shown with reference to FIG. 7. The receive end shown in FIG. 10 may include a processing module 101 and a receiving module 102.

The processing module 101 is configured to determine a second time domain resource used for sending control information of scheduled data in a transmission period, where the second time domain resource is a subset of a first time domain resource, and the first time domain resource is a time domain resource of the scheduled data in the transmission period.

In an optional implementation, the second time domain resource includes M child time domain resources, and each child time domain resource includes K subframes used for sending the control information, where M and K are signaling configured or predefined, and M and K are positive integers not less than 1.

In another optional implementation, the second time domain resource includes N subframes used for sending the control information, where N is signaling configured or predefined, and N is a positive integer not less than 1.

Further, a start subframe of the second time domain resource is determined after a start subframe of the first time domain resource is offset by using a preset offset value.

The preset offset value includes Q candidate values, where Q is signaling configured or predefined, and Q is a positive integer not less than 1.

The receiving module 102 is configured to receive the control information on the second time domain resource, where the control information includes a parameter used to instruct the receive end to receive the scheduled data.

The receiving module 102 is specifically configured to:

determine a time domain location of the control information in the second time domain resource in a predefined time domain location determining manner, and detect and receive the control information at the determined time domain location according to a frequency domain resource set.

Further, the receiving module 102 may be further specifically configured to:

successively detect the control information at the determined time domain location according to the frequency domain resource set, and if the control information is not detected at a current time domain location, detect the control information at a next time domain location.

The frequency domain resource set of the second time domain resource is determined in at least one of the following manners:

determined by an indication identifier in the control information; determined by a subframe number of a subframe in which the control information is located;

determined by a radio frame number of a subframe in which the control information is located;

determined by a carrier identifier of a carrier in which the control information is located; or determined in a preset manner in which the control information is mapped to a physical resource block.

It may be understood that a function of each function module of the receive end 10 in this embodiment may be specifically implemented according to the methods in the foregoing method embodiments. For details, refer to related descriptions in the method embodiment in FIG. 7, and details are not described herein again.

Figure 11:
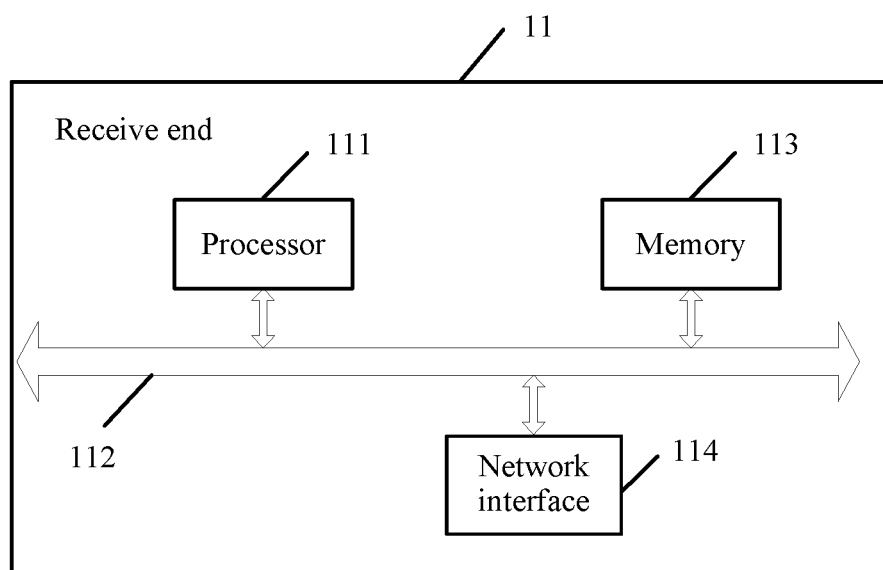
FIG. 11 is a schematic structural diagram of another transmit end according to an embodiment of the present invention.

Referring to FIG. 11, FIG. 11 is a schematic structural diagram of another receive end according to an embodiment of the present invention. The receive end provided in this embodiment of the present invention may be configured to implement the method implemented in the foregoing embodiment shown in FIG. 7. For ease of description, only a part related to this embodiment of the present invention is illustrated. For undisclosed specific technical details, refer to the embodiments of the present invention shown in FIG. 7.

As shown in FIG. 11, the receive end 11 may include: at least one processor 111, for example, a CPU, at least one communications bus 112, a memory 113, and a network interface 114. The communications bus 112 is configured to implement connection and communication between these components. The network interface 114 may include a standard wired interface, a wireless interface (such as a WI-FI interface), and is configured to communicate with an external network. The memory 113 may be a high-speed RAM memory or a non-volatile memory, such as at least one magnetic disk memory. Alternatively, the memory 113 may be at least one storage apparatus located far away from the processor 111.

The memory 113 stores a group of program code, and the processor 111 is configured to invoke the program code stored in the memory 113 and is configured to perform the following operations:

determining a second time domain resource used for sending control information of scheduled data in a transmission period, where the second time domain resource is a subset of a first time domain resource, and the first time domain resource is a time domain resource of the scheduled data in the transmission period; and receiving the control information on the second time domain resource by using the network interface 114, where the control information includes a parameter used to instruct the receive end to receive the scheduled data.

Specifically, the receive end described in this embodiment of the present invention may be configured to implement some or all procedures in the method embodiment described in the present invention with reference to FIG. 7.

The present invention further provides a computer storage medium, where the computer storage medium stores a program, and when executed, the program includes some or all steps of the method in FIG. 3.

The present invention further provides a computer storage medium, where the computer storage medium stores a program, and when executed, the program includes some or all steps of the method in FIG. 7.

This embodiment of the present invention provides a control information transmission method, in which a timely sending mechanism may be provided for important data meeting a preset condition, to reduce a transmission delay of the important data. Details are separately described below with reference to FIG. 12 and FIG. 13.

Figure 12:
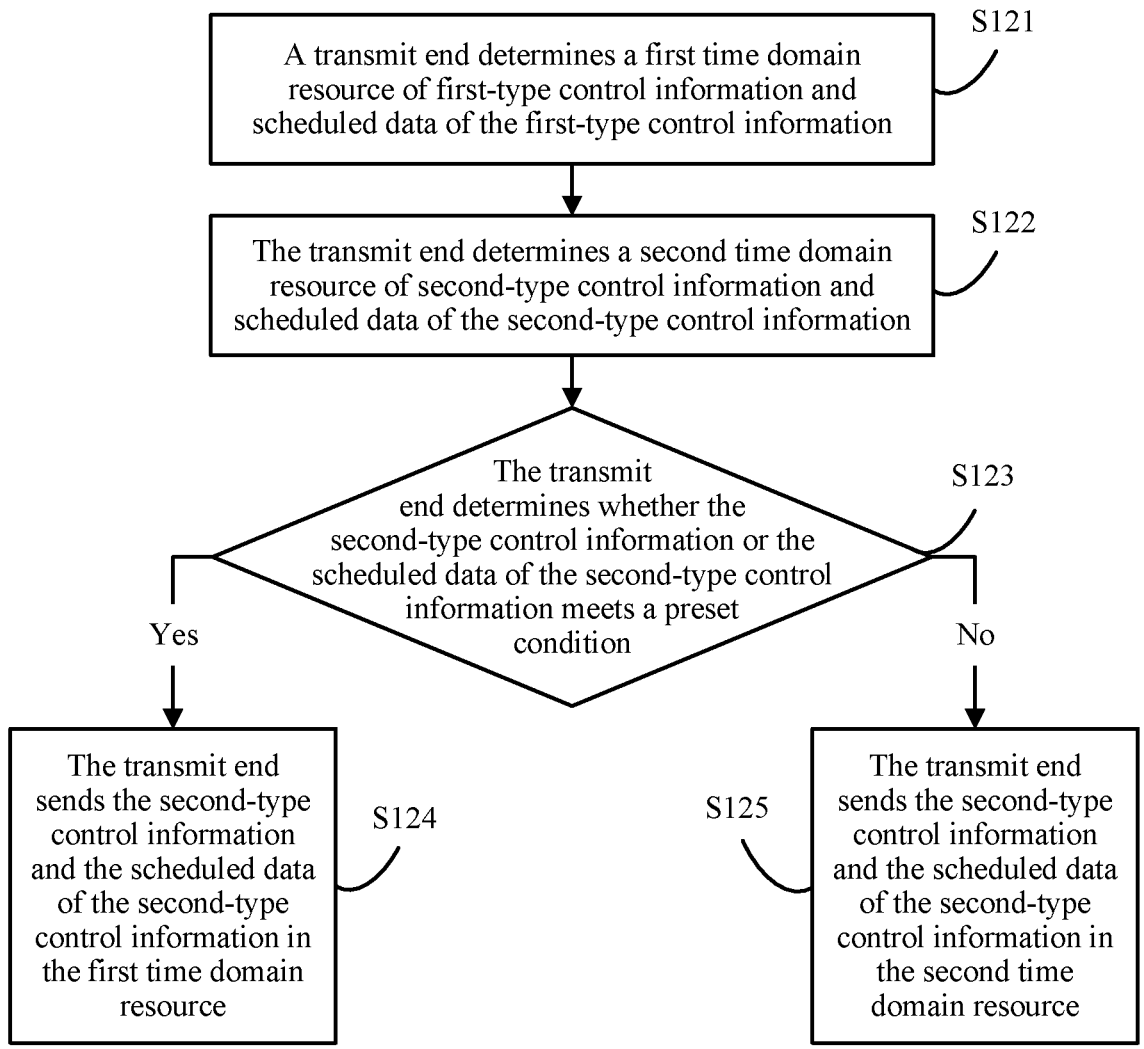
FIG. 12 is a schematic flowchart of still another control information transmission method according to an embodiment of the present invention.

Referring to FIG. 12, FIG. 12 is a schematic structural diagram of another control information transmission method according to an embodiment of the present invention. This embodiment of the present invention is described from a perspective of a transmit end. As shown in FIG. 12, the method includes the following steps.

Step S121: A transmit end determines a first time domain resource of first-type control information and scheduled data of the first-type control information.

Specifically, the transmit end determines the first time domain resource in a preset indication manner from a time domain resource provided by a system. The preset indication manner includes but is not limited to a bit mapping value, a predefined field, a table indication, and a length type value indication, and the bit mapping value is used as an example.

It is assumed that a transmission period of the scheduled data is 320 ms, that is, the transmission period includes 320 subframes. However, not all the 320 subframes are used for device-to-device communication. The transmit end may determine a subframe used for device-to-device communication from the 320 subframes according to a signaling indication, and then determine a data subframe used for transmitting data of the transmit end from the subframe used for device-to-device communication. Herein, the determined data subframes form the first time domain resource.

The bit mapping value is used as an example of the preset indication manner, and the transmit end may determine the first time domain resource by using a TRP whose length is S from the time domain resource provided by the system. S is signaling configured or predefined. A basic unit of the time domain resource in the present invention may be described by using a subframe, a length of time occupied by the subframe is predefined, and a value of the length of time may be similar to a length of 1 ms in the current LTE protocol, or may be 10 ms, 0.5 ms, 0.1 ms, or the like. This is not limited in the present invention. In this embodiment of the present invention, for ease of description, a length of 1 ms is used as an example for description.

It is assumed that 24 subframes in the 320 subframes may be used for device-to-device communication, and S=8, that is, the 24 subframes are classified into three groups, and each group indicates a data subframe by using eight bits. As shown in FIG. 4, in a first group, if a second subframe and a sixth subframe may be used for transmitting the data of the transmit end, the remaining two groups that are obtained by means of division by using S as a unit appear at a same location. One group herein may be referred to as one child time domain resource. K indicates a quantity of data subframes in each child time domain resource that are used for transmitting the data of the transmit end, K is a positive integer not less than 1, and a value of K may be signaling configured or predefined.

It should be noted that, the first time domain resource may be a signaling indicated resource or a predefined resource, and before the transmit end sends the second-type control information and the scheduled data of the second-type control information in the first time domain resource, the first time domain resource may be a time domain resource currently being used by the transmit end, or may be a time domain resource currently being used by another transmit end. Optionally, the first time domain resource may also be an idle time domain resource.

Step S122: The transmit end determines a second time domain resource of second-type control information and scheduled data of the second-type control information.

The transmit end determines the second time domain resource in a preset indication manner from a time domain resource provided by a system. For specific indication, refer to the description of the first time domain resource, and details are not described herein again.

Further, the first time domain resource includes J child time domain resource groups, and each child time domain resource group includes at least one child time domain resource, where J is a positive integer not less than 1.

The first time domain resource is divided into multiple child time domain resource groups, unimportant data (such as low-priority data and periodic data) may be sent by using the first time domain resource as a period, and important data (such as high-priority data and event-triggered data) may be sent by using the child time domain resource group as a period, so that the important data can occupy more resources and can be completely sent as soon as possible, and a transmission delay of the important data is further shortened.

Step S123: The transmit end determines whether the second-type control information or the scheduled data of the second-type control information meets a preset condition; and if the second-type control information or the scheduled data of the second-type control information meets the preset condition, perform step S124; or if the second-type control information or the scheduled data of the second-type control information does not meet the preset condition, perform step S125.

The preset condition includes at least one of the following conditions:

A priority of the scheduled data of the second-type control information is higher than a priority of the scheduled data of the first-type control information. The priority may be determined according to urgency of the scheduled data, delay tolerance, a quality of service (QoS) requirement, a transmission frequency, a transmission interval, or a transmission period, or the like. The higher priority of the scheduled data of the second-type control information is corresponding to at least one of the following: more urgent second-type control information, a shorter transmission delay of the second-type control information, a higher QoS requirement of the second-type control information, a higher transmission frequency of the second-type control information, or a shorter transmission period or interval of the second-type control information.

A data type of the scheduled data of the second-type control information is a triggering event, for example, event-triggered emergency brake, vehicle breakdown, or collision warning. However, a data type of the scheduled data of the first-type control information is a periodic event, for example, periodically sent regular data such as location information and speed information of a vehicle, and is not event-triggered.

A transmission period of the second time domain resource is not greater than a transmission period of the first time domain resource. That is, a quantity of subframes used for sending the control information and the scheduled data of the control information in the second time domain resource is less than or equal to a quantity of subframes used for sending the control information and the scheduled data of the control information in the first time domain resource.

The second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

Further, the transmit end may send the second-type control information and the scheduled data of the second-type control information in at least two child time domain resource groups, so that the important data can occupy more resources.

Step S124: The transmit end sends the second-type control information and the scheduled data of the second-type control information in the first time domain resource.

If the second-type control information and the scheduled data of the second-type control information meet the preset condition, it indicates that the priority of the scheduled data of the second-type control information is higher than the priority of scheduled data of the first-type control information, or the data type of the scheduled data of the second-type control information is a triggering event, or a resource quantity of the second time domain resource is insufficient or a resource conflict exceeds a predefined value, and the transmit end sends the second-type control information and the scheduled data of the second-type control information in the first time domain resource. This shortens a transmission delay of the important data compared with the prior art in which the second-type control information and the scheduled data of the second-type control information can be sent only in the second time domain resource.

In an optional implementation, the transmit end may send the second-type control information and the scheduled data of the second-type control information after a current transmission period of the first time domain resource ends; in this case, the transmit end currently sends or does not send the first-type control information or the scheduled data of the first-type control information in the first time domain resource.

In another optional implementation, the transmit end may send the second-type control information and the scheduled data of the second-type control information in a current transmission period of the first time domain resource; in this case, if the transmit end currently sends the first-type control information or the scheduled data of the first-type control information in the first time domain resource, the transmit end may stop sending or discard the first-type control information and/or the scheduled data of the first-type control information.

The transmit end may specifically send the second-type control information and scheduled data of the second-type control information in the first time domain resource in the following manners:

Manner 1: The transmit end selects at least one child time domain resource group from the first time domain resource to send the second-type control information and the scheduled data of the second-type control information, where the selected child time domain resource group has at least one data packet of the second control information.

Further, if the scheduled data of the second-type control information is completely sent in a current transmission period of the first time domain resource, the transmit end may continue to send the scheduled data of the second-type control information in a next transmission period of the first time domain resource.

Manner 2: The transmit end sends the second-type control information and the scheduled data of the control information at a time interval of a transmission period of the first time domain resource. For example, a transmission period of the second time domain resource is not greater than the transmission period of the first time domain resource, and the scheduled data that is of the second-type control information and that is corresponding to the second time domain resource is periodic data with a relatively low priority. To save a resource, the transmit end may send the second control information and the scheduled data of the second-type control information at the time interval of the transmission period of the first time domain resource.

Manner 3: The transmit end sends at least one piece of the second-type control information and at least one piece of the scheduled data of the second-type control information in the first time domain resource.

Manner 4: The transmit end may send the second-type control information and the scheduled data in the first time domain resource according to duration. The duration may be at least one transmission period of the first time domain resource and/or at least one time domain resource group of the first time domain resource. The duration may be signaling configured or predefined.

It should be noted that a subframe that is of the first time domain resource and that is occupied by the second-type control information is completely the same as, partially the same as, or totally different from a subframe that is of the first time domain resource and that is occupied by the scheduled data.

Further, if the transmit end sends the first-type control information or the scheduled data in the current transmission period of the first time domain resource, and after the second-type control information is completely sent, the transmit end may further continue to send the first-type control information and/or the scheduled data of the first-type control information in the first time domain resource, or resend the first-type control information and/or the scheduled data of the first-type control information in the first time domain resource.

Step S125: The transmit end sends the second-type control information and the scheduled data of the second-type control information in the second time domain resource.

If the second-type control information and the scheduled data of the second-type control information do not meet the preset condition, it indicates that the scheduled data of the second-type control information is unimportant data, and the transmit end sends the second-type control information in the second time domain resource.

In the embodiment shown in FIG. 12, if the second-type control information and the scheduled data of the second-type control information meet the preset condition, it indicates that the priority of the scheduled data of the second-type control information is higher than the priority of the scheduled data of the first-type control information, or the second-type control information is a triggering event, or a resource quantity of the second time domain resource is insufficient or a resource conflict exceeds a predefined value, and so on, and the transmit end sends the second-type control information and the scheduled data of the second-type control information in the first time domain resource. This shortens a transmission delay of the important data compared with the prior art in which the second-type control information and the scheduled data of the second-type control information can be sent only in the second time domain resource.

Figure 13:
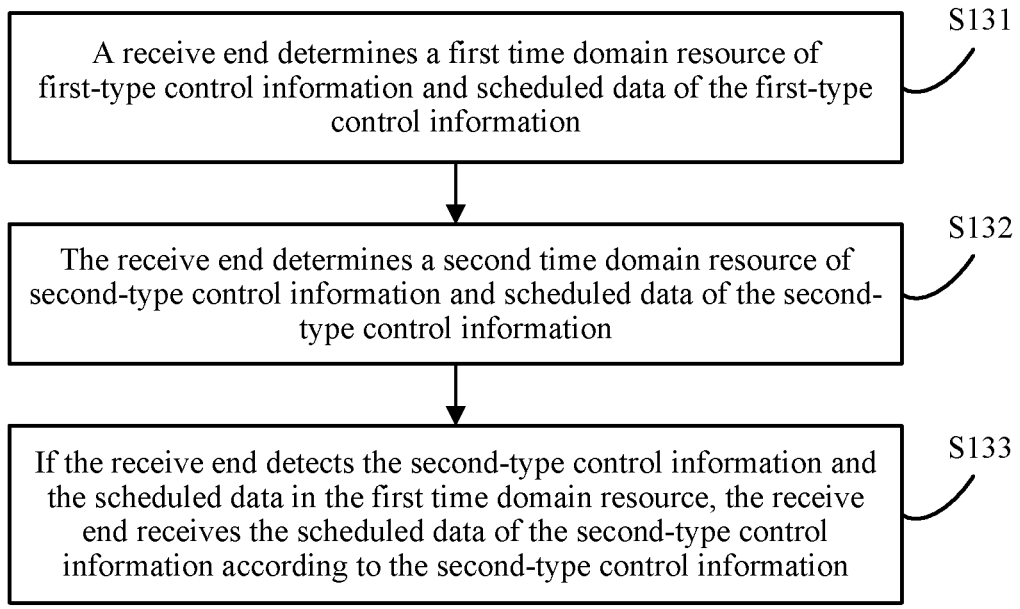
FIG. 13 is a schematic flowchart of still another control information transmission method according to an embodiment of the present invention.

Referring to FIG. 13, FIG. 13 is a schematic flowchart of another control information transmission method according to an embodiment of the present invention. This embodiment of the present invention is described from a perspective of a receive end. As shown in FIG. 13, the method includes the following steps.

Step S131: A receive end determines a first time domain resource of first-type control information and scheduled data of the first-type control information.

Specifically, the receive end determines the first time domain resource in a preset indication manner from a time domain resource provided by a system. The preset indication manner includes but is not limited to a bit mapping value, a predefined field, a table indication, and a length type value indication, and the bit mapping value is used as an example.

It is assumed that a transmission period of the scheduled data is 320 ms, that is, the transmission period includes 320 subframes. However, not all the 320 subframes are used for device-to-device communication. The receive end may determine a subframe used for device-to-device communication from the 320 subframes according to a signaling indication, and then determine a data subframe used for transmitting data of the transmit end from the subframe used for device-to-device communication. Herein, the determined data subframes form the first time domain resource.

The bit mapping value is used as an example of the preset indication manner, and the receive end may determine the first time domain resource by using a TRP whose length is S from the time domain resource provided by the system. S is signaling configured or predefined. A basic unit of the time domain resource in the present invention may be described by using a subframe, a length of time occupied by the subframe is predefined, and a value of the length of time may be similar to a length of 1 ms in the current LTE protocol, or may be 10 ms, 0.5 ms, 0.1 ms, or the like. This is not limited in the present invention. In this embodiment of the present invention, for ease of description, a length of 1 ms is used as an example for description.

It is assumed that 24 subframes in the 320 subframes may be used for device-to-device communication, and S=8, that is, the 24 subframes are classified into three groups, and each group indicates a data subframe by using eight bits. As shown in FIG. 4, in a first group, if a second subframe and a sixth subframe may be used for transmitting the data of the transmit end, the remaining two groups that are obtained by means of division by using S as a unit appear at a same location. One group herein may be referred to as one child time domain resource. K indicates a quantity of data subframes in each child time domain resource that are used for transmitting the data of the transmit end, K is a positive integer not less than 1, and a value of K may be signaling configured or predefined.

It should be noted that the first time domain resource may be a signaling indicated resource or a predefined resource, and the receive end may further receive the first-type control information or the scheduled data of the first-type control information in the first time domain resource before receiving the second-type control information and the scheduled data of the second-type control information in the first time domain resource. Optionally, the first time domain resource may also be an idle time domain resource.

Step S132: The receive end determines a second time domain resource of second-type control information and scheduled data of the second-type control information.

The receive end determines the second time domain resource in a preset indication manner from a time domain resource provided by a system. For specific indication, refer to the description of the first time domain resource, and details are not described herein again.

Further, the first time domain resource includes J child time domain resource groups, and each child time domain resource group includes at least one child time domain resource, where J is a positive integer not less than 1.

Step S133: If the receive end detects the second-type control information and the scheduled data in the first time domain resource, the receive end receives the scheduled data of the second-type control information according to the second-type control information.

Specifically, if the receive end detects the second-type control information and the scheduled data in the first time domain resource, the receive end may directly receive the scheduled data of the second-type control information according to the second-type control information.

Further, if the receive end detects the second-type control information and the scheduled data in the first time domain resource, the receive end may further determine whether the second-type control information or the scheduled data of the second-type control information meets a preset condition, and when the second-type control information or the scheduled data of the second-type control information meets the preset condition, the receive end receives the scheduled data of the second-type control information according to the second-type control information.

The preset condition includes at least one of the following conditions:

A priority of the scheduled data of the second-type control information is higher than a priority of the scheduled data of the first-type control information. The priority may be determined according to urgency of the scheduled data, delay tolerance, a quality of service (QoS) requirement, a transmission frequency, a transmission interval, or a transmission period, or the like. The higher priority of the scheduled data of the second-type control information is corresponding to at least one of the following: more urgent second-type control information, a shorter transmission delay of the second-type control information, a higher QoS requirement of the second-type control information, a higher transmission frequency of the second-type control information, or a shorter transmission period or interval of the second-type control information.

A data type of the scheduled data of the second-type control information is a triggering event, and a data type of the scheduled data of the first-type control information is a periodic event. The data type of the scheduled data of the second-type control information is a triggering event, for example, event-triggered emergency brake, vehicle breakdown, or collision warning. However, the data type of the scheduled data of the first-type control information is a periodic event, for example, periodically sent regular data such as location information and speed information of a vehicle.

A transmission period of the second time domain resource is not greater than a transmission period of the first time domain resource. That is, a quantity of subframes used for sending the control information and the scheduled data of the control information in the second time domain resource is less than or equal to a quantity of subframes used for sending the control information and the scheduled data of the control information in the first time domain resource.

The second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

Optionally, if the receive end is receiving the first-type control information or the scheduled data of the first-type control information when detecting the second-type control information and the scheduled data in the first time domain resource, the receive end discards or stops receiving the first-type control information and the scheduled data of the first-type control information.

In the embodiment shown in FIG. 13, if the second-type control information and the scheduled data of the second-type control information meet the preset condition, it indicates that the priority of the scheduled data of the second-type control information is higher than the priority of scheduled data of the first-type control information, or the second-type control information is a triggering event, or a resource quantity of the second time domain resource is insufficient or a resource conflict exceeds a predefined value, and so on, and the transmit end sends the second-type control information and the scheduled data of the second-type control information in the first time domain resource. This shortens a transmission delay of this type of data compared with the prior art in which the second-type control information and the scheduled data of the second-type control information can be sent only in the second time domain resource.

Figure 14:
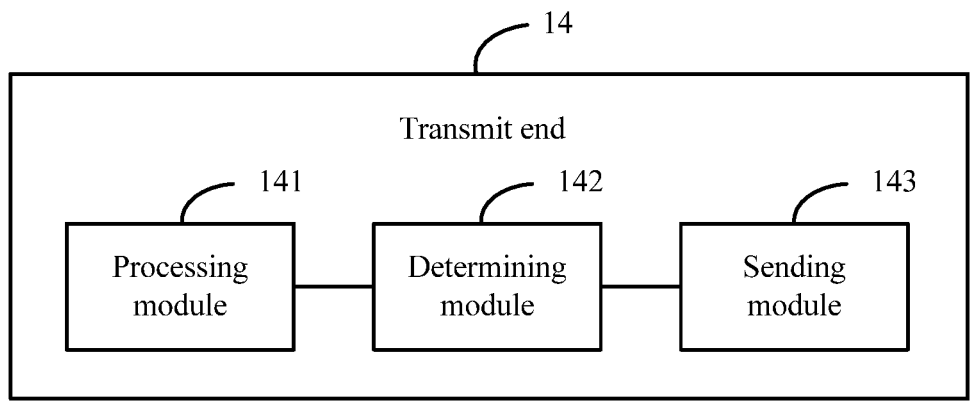
FIG. 14 is a schematic structural diagram of still another transmit end according to an embodiment of the present invention.

Referring to FIG. 14, FIG. 14 is a schematic structural diagram of a transmit end according to an embodiment of the present invention. The transmit end 14 may be configured to implement some or all steps in the method embodiment shown with reference to FIG. 12. The transmit end shown in FIG. 14 may include a processing module 141, a determining module 142, and a sending module 143.

The processing module 141 is configured to determine a first time domain resource of first-type control information and scheduled data of the first-type control information.

The processing module 141 is further configured to determine a second time domain resource of second-type control information and scheduled data of the second-type control information.

The determining module 142 is configured to determine whether the second-type control information or the scheduled data of the second-type control information meets a preset condition.

The preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

The second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

The sending module 143 is configured to: if the second-type control information or the scheduled data of the second-type control information meets the preset condition, send the second-type control information and the scheduled data of the second-type control information in the first time domain resource.

The sending module 143 may be specifically configured to:

send the second-type control information and the scheduled data of the second-type control information after a current transmission period of the first time domain resource ends; or send the second-type control information and the scheduled data of the second-type control information in a current transmission period of the first time domain resource.

Further, after completely sending the second-type control information and the scheduled data of the second-type control information, the sending module 143 is further configured to:

continue to send the first-type control information and/or the scheduled data of the first-type control information in the first time domain resource; or resend the first-type control information and/or the scheduled data of the first-type control information in the first time domain resource.

Optionally, the first time domain resource includes J child time domain resource groups, and the sending module 143 may send the second-type control information and the scheduled data of the second-type control information in at least two child time domain resource groups. Each child time domain resource group includes at least one child time domain resource, where J is a positive integer not less than 1.

It may be understood that a function of each function module of the transmit end 14 in this embodiment may be specifically implemented according to the methods in the foregoing method embodiments. For details, refer to related descriptions in the method embodiment in FIG. 12, and details are not described herein again.

Figure 15:
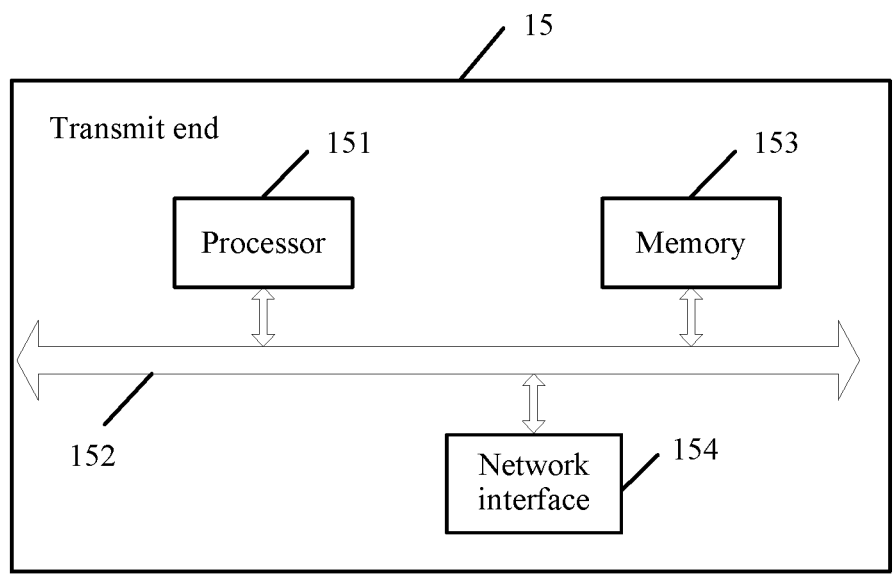
FIG. 15 is a schematic structural diagram of still another transmit end according to an embodiment of the present invention.

Referring to FIG. 15, FIG. 15 is a schematic structural diagram of another transmit end according to an embodiment of the present invention. The transmit end provided in this embodiment of the present invention may be configured to implement the method implemented in the foregoing embodiment shown in FIG. 12. For ease of description, only a part related to this embodiment of the present invention is illustrated. For undisclosed specific technical details, refer to the embodiments of the present invention shown in FIG. 12.

As shown in FIG. 15, the transmit end 15 may include: at least one processor 151, for example, a CPU, at least one communications bus 152, a memory 153, and a network interface 154. The communications bus 152 is configured to implement connection and communication between these components. The network interface 154 may include a standard wired interface, a wireless interface (such as a WI-FI interface), and is configured to communicate with an external network. The memory 153 may be a high-speed RAM memory or a non-volatile memory, such as at least one magnetic disk memory. Alternatively, the memory 153 may be at least one storage apparatus located far away from the processor 151.

The memory 153 stores a group of program code, and the processor 151 is configured to invoke the program code stored in the memory 153 and is configured to perform the following operations:

determining a first time domain resource of first-type control information and scheduled data of the first-type control information;

determining a second time domain resource of second-type control information and scheduled data of the second-type control information; and determining whether the second-type control information or the scheduled data of the second-type control information meets a preset condition; and if the second-type control information or the scheduled data of the second-type control information meets the preset condition, sending the second-type control information and the scheduled data of the second-type control information in the first time domain resource by using the network interface 154.

Specifically, the transmit end described in this embodiment of the present invention may be configured to implement some or all procedures in the method embodiment described in the present invention with reference to FIG. 12.

Figure 16:
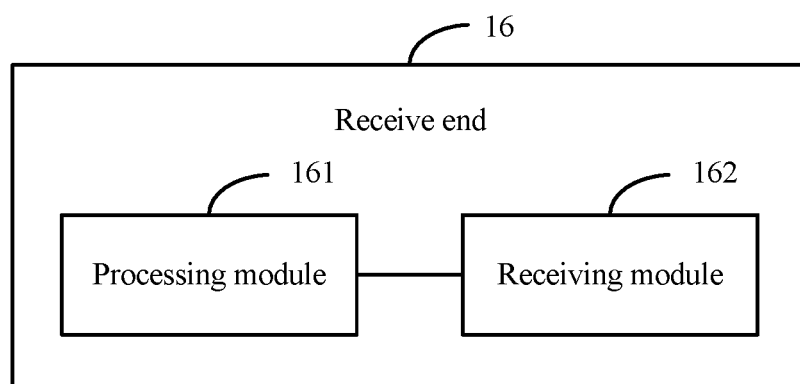
FIG. 16 is a schematic structural diagram of still another receive end according to an embodiment of the present invention.

Referring to FIG. 16, FIG. 16 is a schematic structural diagram of a receive end according to an embodiment of the present invention. The receive end 16 may be configured to implement some or all steps in the method embodiment shown with reference to FIG. 13. The receive end shown in FIG. 16 may include a processing module 161 and a receiving module 162.

The processing module 161 is configured to determine a first time domain resource of first-type control information and scheduled data of the first-type control information.

Optionally, the first time domain resource includes J child time domain resource groups, and each child time domain resource group includes at least one child time domain resource, where J is a positive integer not less than 1.

The processing module 161 is further configured to determine a second time domain resource of second-type control information and scheduled data of the second-type control information.

The receiving module 162 is configured to: if the receive end detects the second-type control information and the scheduled data in the first time domain resource, receive the scheduled data of the second-type control information according to the second-type control information.

The receiving module 162 is further configured to:

if the receive end detects the second-type control information and the scheduled data in the first time domain resource, determine whether the second-type control information or the scheduled data of the second-type control information meets a preset condition; and if the second-type control information or the scheduled data of the second-type control information meets the preset condition, receive the scheduled data of the second-type control information according to the second-type control information.

The preset condition includes at least one of the following conditions:

a priority of the scheduled data of the second-type control information is higher than a priority of the scheduled data of the first-type control information;

a data type of the scheduled data of the second-type control information is a triggering event, and a data type of the scheduled data of the first-type control information is a periodic event; or a transmission period of the second time domain resource is not greater than a transmission period of the first time domain resource.

The second-type control information includes at least one of the following information:

priority indication information of the scheduled data of the second-type control information;

data type indication information of the scheduled data of the second-type control information, where the data type indication information is used to indicate whether the scheduled data of the second-type control information is event-triggered; or transmission period indication information of the scheduled data of the second-type control information.

The receiving module 162 may be further configured to:

if the receive end is receiving the first-type control information and the scheduled data of the first-type control information when detecting the second-type control information and the scheduled data in the first time domain resource, discard or stop receiving the first-type control information and the scheduled data of the first-type control information.

It may be understood that a function of each function module of the receive end 16 in this embodiment may be specifically implemented according to the methods in the foregoing method embodiments. For details, refer to related descriptions in the method embodiment in FIG. 13, and details are not described herein again.

Figure 17:
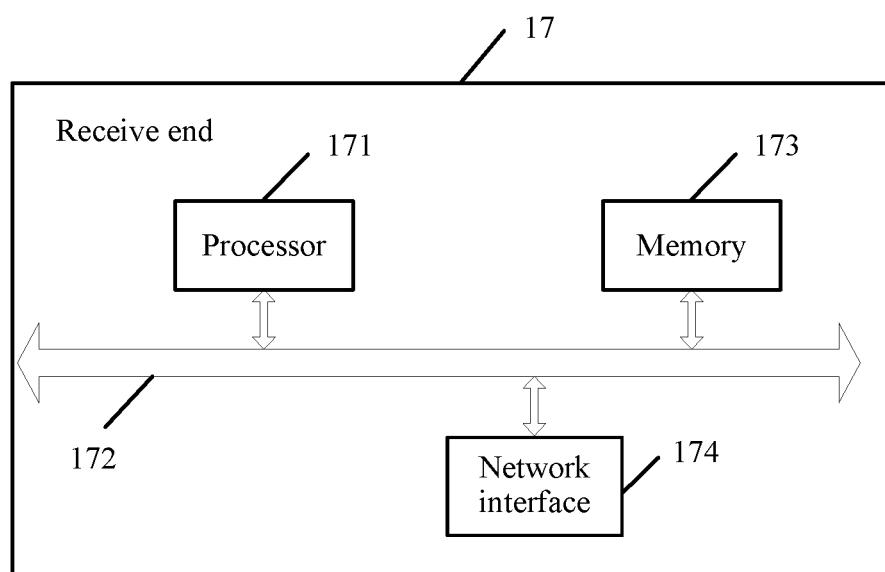
FIG. 17 is a schematic structural diagram of still another transmit end according to an embodiment of the present invention.

Referring to FIG. 17, FIG. 17 is a schematic structural diagram of another receive end according to an embodiment of the present invention. The receive end provided in this embodiment of the present invention may be configured to implement the method implemented in the foregoing embodiment shown in FIG. 13. For ease of description, only a part related to this embodiment of the present invention is illustrated. For undisclosed specific technical details, refer to the embodiments of the present invention shown in FIG. 13.

As shown in FIG. 17, the receive end 17 may include: at least one processor 171, for example, a CPU, at least one communications bus 172, a memory 173, and a network interface 174. The communications bus 172 is configured to implement connection and communication between these components. The network interface 174 may include a standard wired interface, a wireless interface (such as a WI-FI interface), and is configured to communicate with an external network. The memory 173 may be a high-speed RAM memory or a non-volatile memory, such as at least one magnetic disk memory. Alternatively, the memory 173 may be at least one storage apparatus located far away from the processor 171.

The memory 173 stores a group of program code, and the processor 171 is configured to invoke the program code stored in the memory 173 and is configured to perform the following operations:

determining a first time domain resource of first-type control information and scheduled data of the first-type control information;

determining a second time domain resource of second-type control information and scheduled data of the second-type control information; and if the receive end detects the second-type control information and the scheduled data in the first time domain resource by using the network interface 174, receiving the scheduled data of the second-type control information according to the second-type control information.

Specifically, the receive end described in this embodiment of the present invention may be configured to implement some or all procedures in the method embodiment described in the present invention with reference to FIG. 13. The present invention further provides a computer storage medium, where the computer storage medium stores a program, and when executed, the program includes some or all steps of the method in FIG. 12.

The present invention further provides a computer storage medium, where the computer storage medium stores a program, and when executed, the program includes some or all steps of the method in FIG. 13.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A control information transmission method, comprising:

determining, by a control information receiving apparatus, a first time domain resource of first-type control information and scheduled data of the first-type control information;

wherein the first time domain resource of first-type control information comprises a first start subframe determined by selecting from at least one candidate offset value;

determining, by the control information receiving apparatus, a second time domain resource of second-type control information and scheduled data of a second-type control information;

wherein the second time domain resource of second-type control information comprises a second start subframe determined by the start subframe of the first time domain resource of first-type control information;

determining, by the control information receiving apparatus, the start subframe of the second time domain resource of the second-type control information according to the at least one candidate offset value, and a time domain location of scheduled data of the second-type control information, and wherein a frequency domain location of scheduled data of the second-type control information is indicated by an indicator in the second-type control information;

wherein the indicator further identifies a service type and a service priority;

when the control information receiving apparatus detects the second-type control information and the scheduled data in the first time domain resource, receiving the scheduled data of the second-type control information according to the second-type control information, via the frequency domain location and the time domain location;

wherein the frequency domain resource set is determined by a carrier identifier of a carrier in which the control information is located, and wherein the carrier identifier is used as an input variable for a function for determining the frequency domain location of the second-type control information;

when the control information receiving apparatus detects the second-type control information and the scheduled data in the first time domain resource, determining whether the second-type control information or the scheduled data of the second-type control information meets a preset condition; and when the second-type control information or the scheduled data of the second-type control information meets the preset condition, performing, by the control information receiving apparatus, the step of receiving the scheduled data of the second-type control information according to the second-type control information, and wherein the preset condition comprises a priority of the scheduled data of the second-type control information is higher than a priority of the scheduled data of the first-type control information.

2. The method according to claim 1, wherein:

the preset condition further comprises at least one of the following conditions:

an urgency of the scheduled data or delay tolerance;

a data type of the scheduled data of the second-type control information is a triggering event, and a data type of the scheduled data of the first-type control information is a periodic event; or a transmission period of the second time domain resource is not greater than a transmission period of the first time domain resource.

3. The method according to claim 1, wherein the second-type control information comprises at least one of the following information:

priority indication information of the scheduled data of the second-type control information;

data type indication information of the scheduled data of the second-type control information, wherein the data type indication information is used to indicate whether the scheduled data of the second-type control information is event-triggered; or transmission period indication information of the scheduled data of the second-type control information.

4. The method according to claim 1, further comprising:

when the control information receiving apparatus is receiving the first-type control information and the scheduled data of the first-type control information when detecting the second-type control information and the scheduled data in the first time domain resource, discarding or stopping receiving the first-type control information and the scheduled data of the first-type control information.

5. The method according to claim 1, wherein:
the first time domain resource comprises J child time domain resource groups, and each child time domain resource group comprises at least one child time domain resource, wherein J is a positive integer not less than 1.

6. A control information transmitting apparatus, comprising:
a storage medium to store a computer program; and
computer hardware to execute the computer program to implement:
a processor, configured to determine a first time domain resource of first-type control information and scheduled data of the first-type control information, wherein the first time domain resource of first-type control information comprises a first start subframe, wherein the start subframe selects from at least one candidate offset value;
wherein the processor is further configured to determine a second time domain resource of second-type control information and scheduled data of the second-type control information, wherein the second time domain resource of second-type control information comprises a second start subframe according to the first start subframe;
wherein the processor is further configured to determine whether the second-type control information or the scheduled data of the second-type control information meets a preset condition;
wherein the processor is further configured to determine, via the second time domain resource, a time domain location of scheduled data of the second-type control information, and wherein a frequency domain location of scheduled data of the second-type control information is further indicated by an indicator in the second-type control information; and
wherein the indicator further identifies at least one of: a service type, a service priority, or a packet size of the scheduled data; and
a transmitter, configured to: when the second-type control information or the scheduled data of the second-type control information meets the preset condition, send the second-type control information and the scheduled data of the second-type control information in the first time domain resource, via the determined time domain location and frequency domain location,
wherein the frequency domain resource set is determined by a carrier identifier of a carrier in which the control information is located, and wherein the carrier identifier is used as an input variable for a function for determining the frequency domain location of the second-type control information;
and
wherein the preset condition comprises a priority of the scheduled data of the second-type control information is higher than a priority of the scheduled data of the first-type control information.

7. The control information transmitting apparatus according to claim 6, wherein:
the preset condition further comprises at least one of the following conditions:
an urgency of the scheduled data or delay tolerance;
a data type of the scheduled data of the second-type control information is a triggering event, and a data type of the scheduled data of the first-type control information is a periodic event; or
a transmission period of the second time domain resource is not greater than a transmission period of the first time domain resource.

8. The control information transmitting apparatus according to claim 6, wherein:
the second-type control information comprises at least one of the following information:
priority indication information of the scheduled data of the second-type control information;
data type indication information of the scheduled data of the second-type control information, wherein the data type indication information is used to indicate whether the scheduled data of the second-type control information is event-triggered; or
transmission period indication information of the scheduled data of the second-type control information.

9. The control information transmitting apparatus according to claim 6, wherein:
the transmitter is configured to:
send the second-type control information and the scheduled data of the second-type control information after a current transmission period of the first time domain resource ends; or
send the second-type control information and the scheduled data of the second-type control information in a current transmission period of the first time domain resource.

10. The control information transmitting apparatus according to claim 6, wherein after completely sending the second-type control information and the scheduled data of the second-type control information, the transmitter is further configured to:
continue to send the first-type control information and/or the scheduled data of the first-type control information in the first time domain resource; or
resend the first-type control information and/or the scheduled data of the first-type control information in the first time domain resource.

11. The control information transmitting apparatus according to claim 6, wherein:
the first time domain resource comprises J child time domain resource groups, and each child time domain resource group comprises at least one child time domain resource, wherein J is a positive integer not less than 1.

12. The control information transmitting apparatus according to claim 11, wherein the transmitter is configured to:
send the second-type control information and the scheduled data of the second-type control information in at least two child time domain resource groups.

13. A control information transmitting apparatus, comprising:
a storage medium to store a computer program; and
computer hardware to execute the computer program to implement:
a processor, configured to determine a first time domain resource of first-type control information and scheduled data of the first-type control information, wherein the first time domain resource of first-type control information comprises a first start subframe;
wherein the processor is further configured to determine the first start subframe selecting from at least one candidate offset value; and
wherein the processor is further configured to determine a second time domain resource of second-type control information and scheduled data of the second-type control information wherein the second time domain resource of second-type control information comprises a second start subframe according to the first start subframe;
a receiving module, configured to:
determine the second start subframe of the second time domain resource of the second-type control information according to the selected candidate offset value, and a time domain location of scheduled data of the second-type control information, wherein a frequency domain of scheduled data of the second-type control information location is indicated by an indicator in the second-type control information;
wherein the frequency domain resource set is determined by a carrier identifier of a carrier in which the control information is located, and wherein the carrier identifier is used as an input variable for a function for determining the frequency domain location of the second-type control information;
wherein the indicator further identifies at least one of: a service type, a service priority, or a packet size of the scheduled data;
when the control information transmitting apparatus detects the second-type control information and the scheduled data in the first time domain resource, receive, at the determined time domain location and frequency domain location, the scheduled data of the second-type control information according to the second-type control information, and
when the control information transmitting apparatus detects the second-type control information and the scheduled data in the first time domain resource, determine whether the second-type control information or the scheduled data of the second-type control information meets a preset condition; and when the second-type control information or the scheduled data of the second-type control information meets the preset condition, receive the scheduled data of the second-type control information according to the second-type control information,
wherein the preset condition comprises a priority of the scheduled data of the second-type control information is higher than a priority of the scheduled data of the first-type control information.

14. The control information transmitting apparatus according to claim 13, wherein:
the preset condition further comprises at least one of the following conditions:
an urgency of the scheduled data or delay tolerance;
a data type of the scheduled data of the second-type control information is a triggering event, and a data type of the scheduled data of the first-type control information is a periodic event; or
a transmission period of the second time domain resource is not greater than a transmission period of the first time domain resource.

15. The control information transmitting apparatus according to claim 13, wherein the second-type control information comprises at least one of the following information:
priority indication information of the scheduled data of the second-type control information;
data type indication information of the scheduled data of the second-type control information, wherein the data type indication information is used to indicate whether the scheduled data of the second-type control information is event-triggered; or
transmission period indication information of the scheduled data of the second-type control information.

16. The control information transmitting apparatus according to claim 13, wherein:
the receiving module is further configured to:
when the control information transmitting apparatus is receiving the first-type control information and the scheduled data of the first-type control information when detecting the second-type control information and the scheduled data in the first time domain resource, discard or stop receiving the first-type control information and the scheduled data of the first-type control information.

17. The control information transmitting apparatus according to claim 13, wherein:
the first time domain resource comprises J child time domain resource groups, and each child time domain resource group comprises at least one child time domain resource, wherein J is a positive integer not less than 1.

18. The method according to claim 1, wherein the second time domain resource is a subset of a first time domain resource.

19. The method according to claim 1, wherein the higher priority of the scheduled data of the second-type control information is further corresponding to at least one of the following: more urgent second-type control information, a shorter transmission delay of the second-type control information.

20. The control information transmitting apparatus according to claim 6, wherein the second time domain resource is a subset of a first time domain resource.

21. The control information transmitting apparatus according to claim 6, wherein the higher priority of the scheduled data of the second-type control information is further corresponding to at least one of the following: more urgent second-type control information, a shorter transmission delay of the second-type control information.

22. The control information transmitting apparatus according to claim 6, wherein when the second-type control information is completely sent, the control information transmitting apparatus may further continue to send the first-type control information and/or the scheduled data of the first-type control information in the first time domain resource, or resend the first-type control information and/or the scheduled data of the first-type control information in the first time domain resource.

23. The control information transmitting apparatus according to claim 13, wherein the second time domain resource is a subset of a first time domain resource.

24. The control information transmitting apparatus according to claim 13, wherein the higher priority of the scheduled data of the second-type control information is further corresponding to at least one of the following: more urgent second-type control information, a shorter transmission delay of the second-type control information.

* * * * *